(12) United States Patent
Matsumura et al.

(10) Patent No.: US 11,073,701 B2
(45) Date of Patent: Jul. 27, 2021

(54) HEAD-MOUNTED DISPLAY DEVICE

(71) Applicant: Panasonic Intellectual Property Management Co., Ltd., Osaka (JP)

(72) Inventors: Yoshio Matsumura, Osaka (JP); Hiroyasu Makino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 385 days.

(21) Appl. No.: 16/313,172

(22) PCT Filed: Jul. 3, 2017

(86) PCT No.: PCT/JP2017/024292
§ 371 (c)(1),
(2) Date: Dec. 26, 2018

(87) PCT Pub. No.: WO2018/008577
PCT Pub. Date: Jan. 11, 2018

(65) Prior Publication Data
US 2019/0155037 A1 May 23, 2019

(30) Foreign Application Priority Data
Jul. 6, 2016 (JP) .............................. JP2016-134216

(51) Int. Cl.
*G02B 27/02* (2006.01)
*G02B 27/01* (2006.01)

(52) U.S. Cl.
CPC ....... *G02B 27/022* (2013.01); *G02B 27/0172* (2013.01); *G02B 2027/011* (2013.01);
(Continued)

(58) Field of Classification Search
CPC ........ G02B 27/0172; G02B 2027/0123; G02B 2027/0132; G02B 2027/0134; G02B 2027/0178
(Continued)

(56) References Cited

U.S. PATENT DOCUMENTS 5,274,405 A * 12/1993 Webster .................. G02B 6/06
351/158
5,734,505 A  3/1998 Togino et al.
(Continued)

FOREIGN PATENT DOCUMENTS

JP      6-308396      11/1994
JP      7-072420      3/1995
(Continued)

OTHER PUBLICATIONS

International Search Report of PCT application No. PCT/JP2017/024292 dated Sep. 19, 2017.

*Primary Examiner* — Nicholas R. Pasko
(74) *Attorney, Agent, or Firm* — Greenblum & Bernstein, P.L.C.

(57) ABSTRACT

A head-mounted display device includes a first display portion disposed in front of a pupil of a viewer and displaying a first image, a second display portion disposed on an ear side of the viewer and diagonally in front of the pupil and displaying a second image, a first lens disposed between the pupil and the first display portion for projecting a first image onto the pupil, and a second lens disposed between the pupil and the second display portion for projecting a second image onto the pupil. The second lens is disposed adjacent to the first lens on the ear side of the viewer, and an optical axis of the first lens and an optical axis of the second lens intersect with each other at an angle ranging from 30 degrees to 80 degrees inclusive.

19 Claims, 30 Drawing Sheets

(52) U.S. Cl.
CPC ............ *G02B 2027/0123* (2013.01); *G02B 2027/0132* (2013.01); *G02B 2027/0134* (2013.01); *G02B 2027/0178* (2013.01)

(58) Field of Classification Search
USPC .................................................. 359/630–633
See application file for complete search history.

(56) References Cited

U.S. PATENT DOCUMENTS

| | | | |
|---|---|---|---|
| 5,844,713 A | 12/1998 | Nanba et al. | |
| 6,014,117 A * | 1/2000 | Hennessy | G02B 27/017 340/980 |
| 6,072,632 A | 6/2000 | Ophey | |
| 6,529,331 B2 * | 3/2003 | Massof | G02B 27/017 345/9 |
| 7,072,107 B2 * | 7/2006 | Filipovich | G02B 23/12 359/407 |
| 10,288,885 B2 * | 5/2019 | Makino | G02B 6/003 |
| 2004/0021938 A1 | 2/2004 | Filipovich et al. | |
| 2008/0239499 A1 | 10/2008 | Fukuda | |
| 2014/0266990 A1 | 9/2014 | Makino et al. | |
| 2016/0198949 A1 * | 7/2016 | Spitzer | G02B 27/0093 351/204 |
| 2016/0377869 A1 * | 12/2016 | Lee | G02B 27/0172 359/631 |
| 2017/0115489 A1 * | 4/2017 | Hu | G06T 19/006 |
| 2017/0160518 A1 * | 6/2017 | Lanman | G02B 7/287 |
| 2017/0171533 A1 | 6/2017 | Benitez et al. | |
| 2017/0192220 A1 * | 7/2017 | Wang | G02B 1/041 |
| 2017/0208314 A1 * | 7/2017 | Du | G02B 27/0075 |
| 2017/0357089 A1 * | 12/2017 | Tervo | G02B 6/005 |
| 2017/0358136 A1 * | 12/2017 | Collier | G06F 1/163 |

FOREIGN PATENT DOCUMENTS

| | | |
|---|---|---|
| JP | 7-333549 | 12/1995 |
| JP | 8-240786 | 9/1996 |
| JP | 2001-042250 | 2/2001 |
| JP | 2001-511266 | 8/2001 |
| JP | 2004-509371 | 3/2004 |
| JP | 2007-086500 | 4/2007 |
| JP | 2009-232133 | 10/2009 |
| JP | 2010-224479 | 10/2010 |
| WO | 2013/076994 | 5/2013 |
| WO | 2015/077718 | 5/2015 |

* cited by examiner

LEFT (EAR SIDE) ⟵⟶ RIGHT (NOSE SIDE)

LEFT (EAR SIDE) ⟵⟶ RIGHT (NOSE SIDE)

HEAD-MOUNTED DISPLAY DEVICE

CROSS-REFERENCE TO RELATED APPLICATIONS

This application is a U.S. national stage application of the PCT International Application No. PCT/JP2017/024292 filed on Jul. 3, 2017, which claims the benefit of foreign priority of Japanese patent application No. 2016-134216 filed on Jul. 6, 2016, the contents all of which are incorporated herein by reference.

TECHNICAL FIELD

The present disclosure relates to a head-mounted display device.

BACKGROUND ART

Recently, display devices for displaying an image have been increased in size for improving a three-dimensional effect and sense of realism experienced by viewers.

To give an effect provided by a wide field, such as a three-dimensional effect and sense of realism, to the viewer, the display device needs to have a display screen extending over an entire region of 100 degrees horizontal (50 degrees in each of left and right sides) in a visual field of the viewer (the effect provided by a wide field is saturated around 100 degrees). However, in this case, the display device needs to have a display screen of 200 inches or more disposed 2 meters in front of the viewer.

In place of such a large-sized stationary display device, a head-mounted display device worn on the head of the viewer when used has been known as disclosed in PTL 1, for example.

The head-mounted display device disclosed in PTL 1 has a liquid crystal display panel (display portion) and eyepieces. The display portion is disposed in front of the pupils of the eyeballs of the viewer when the head-mounted display device is worn on the head of the viewer. The eyepieces are disposed between the liquid crystal display panel and the eyeballs of the viewer for enlarging an image displayed in the liquid crystal display panel and projecting the enlarged image onto the pupils.

CITATION LIST

Patent Literature

PTL 1: Unexamined Japanese Patent Publication No. 117-72420

SUMMARY OF THE INVENTION

The present disclosure provides a further sense of realism to a viewer by a head-mounted display device.

A head-mounted display device according to one aspect of the present disclosure is worn on a head of a viewer when used. The head-mounted display device includes a first display portion, a second display portion, a first eyepiece, and a second eyepiece. The first display portion is disposed in front of a pupil of the viewer gazing forward, while facing the pupil of the viewer, and displays a first image. The second display portion is disposed on an ear side of the viewer and diagonally in front of the pupil of the viewer gazing forward, while facing the pupil of the viewer, and displays a second image. The first eyepiece is disposed between the pupil of the viewer and the first display portion and projects the first image onto the pupil of the viewer. The first eyepiece has a first display-portion-side lens surface and a first viewer-side lens surface. The second eyepiece is disposed between the pupil of the viewer and the second display portion and projects the second image onto the pupil of the viewer. The second eyepiece has a second display-portion-side lens surface and a second viewer-side lens surface. The second eyepiece is disposed adjacent to the first eyepiece at a position closer to the ear of the viewer than the first eyepiece is. An optical axis of the first eyepiece intersects with an optical axis of the second eyepiece at an angle ranging from 30 degrees to 80 degrees inclusive.

According to the present disclosure, a further sense of realism can be provided to the viewer by the head-mounted display device.

DESCRIPTION OF EMBODIMENTS

Prior to describing exemplary embodiments of the present disclosure, a problem of a conventional device is briefly described. Recently, a head-mounted display device has been demanded to provide a further sense of realism. However, if a display portion (for example, liquid crystal display panel) or an eyepiece is increased in size for this reason, the head-mounted display device may be increased in size and also in weight. This may impair usability of the head-mounted display device.

Exemplary embodiments of a head-mounted display device, according to the present disclosure, which provides a further sense of realism to a viewer while suppressing an increase in size and weight will be described below in detail with reference to the drawings as appropriate. However, detailed descriptions more than necessary may be omitted. For example, detailed descriptions of well-known matters and duplicate descriptions of substantially identical configurations may be omitted. This is to avoid unnecessary redundancy of the following description and facilitate the understanding of those skilled in the art.

Note that, in the following exemplary embodiments, the attached drawings and the following description are provided for those skilled in the art to fully understand the present disclosure, and are not intended to limit the subject matter as described in the appended claims.

First Exemplary Embodiment

Figure 1:
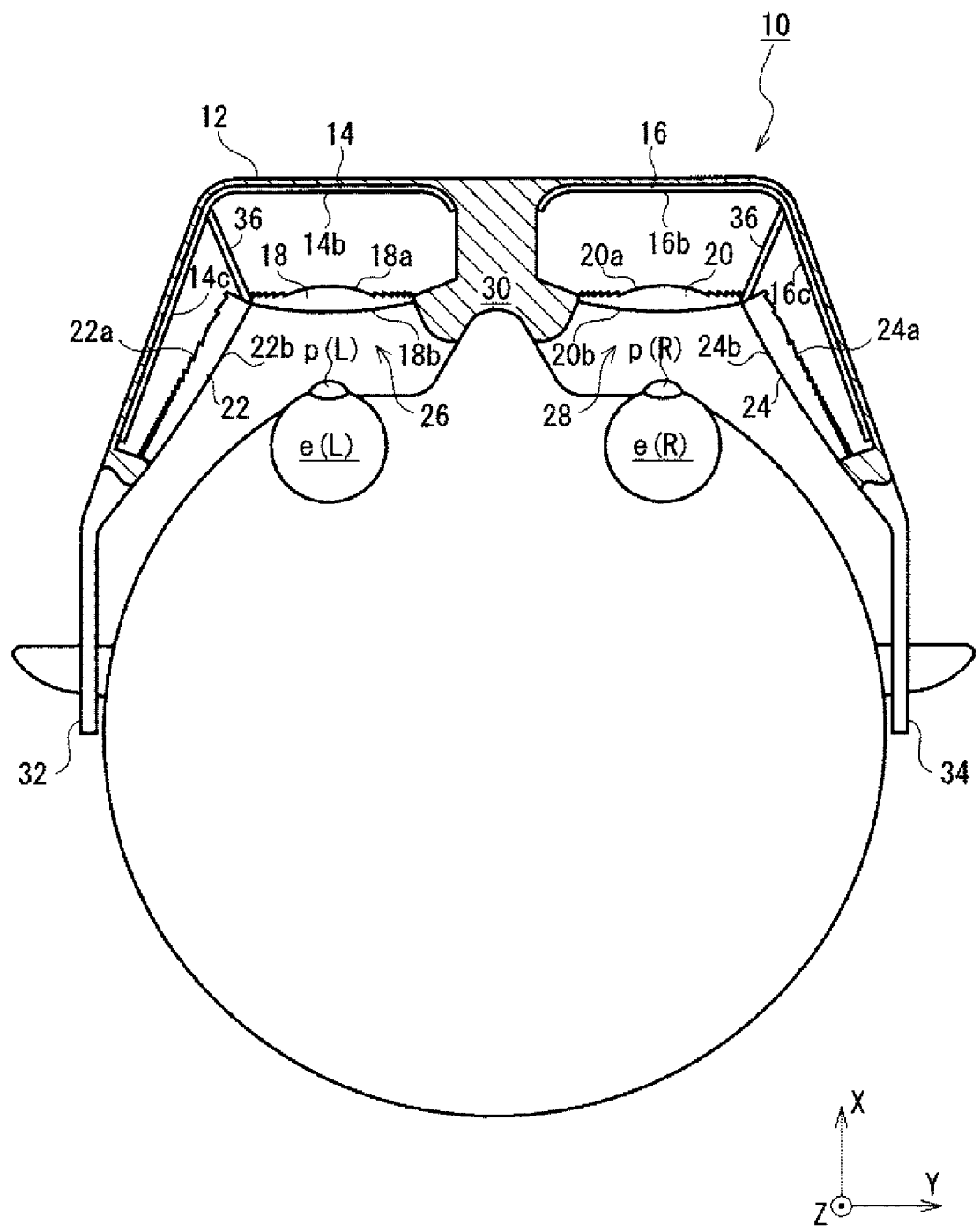
FIG. 1 is a schematic view showing a configuration of a head-mounted display device which is worn on a head of a viewer according to a first exemplary embodiment.

FIG. 1 schematically shows a configuration of a head-mounted display device according to a first exemplary embodiment. FIG. 1 shows the head-mounted display device which is appropriately worn on a head of a viewer.

The drawings include a XYZ coordinate system represented by an X axis, a Y axis, and a Z axis which are mutually orthogonal. The X-axis direction is defined as a front-rear direction on a horizontal plane based on the viewer, the Y-axis direction is defined as a lateral direction on the horizontal plane, and the Z-axis direction is defined as a vertical direction perpendicular to the horizontal plane. The XYZ coordinate system is provided only for facilitating the understanding of the present disclosure, and not intended to limit the present disclosure. Thus, FIG. 1 shows head-mounted display device (hereinafter referred to as display device) 10 when the viewer gazing forward is viewed from above.

Display device 10 according to the exemplary embodiment is worn on the head of the viewer, and more specifically, worn on the head for covering left eyeball e(L) and right eyeball e(R) of the viewer.

Display device 10 has main body 12 to be worn on the head of the viewer. Display device 10 includes, inside main body 12, display 14 for the left eye, display 16 for the right eye, first eyepiece 18 for the left eye, first eyepiece 20 for the right eye, second eyepiece 22 for the left eye, and second eyepiece 24 for the right eye. In addition, first eyepiece 18 and second eyepiece 22 for the left eye are combined to construct lens array 26 for the left eye, and first eyepiece 20 and second eyepiece 24 for the right eye are combined to construct lens array 28 for the right eye. This will be described in detail later.

An optical system for the left eye and an optical system for the right eye are substantially the same except that they are symmetric. That is, displays 14 and 16 are substantially identical, first eyepieces 18 and 20 are substantially identical, and second eyepieces 22 and 24 are substantially identical. First eyepiece 18 has display-side lens surface 18a and viewer-side lens surface 18b, and first eyepiece 20 has display-side lens surface 20a and viewer-side lens surface 20b. Second eyepiece 22 has display-side lens surface 22a and viewer-side lens surface 22b, and second eyepiece 24 has display-side lens surface 24a and viewer-side lens surface 24b. Now, the optical system for the left eye will be mainly described, and the description of the optical system for the right eye will be omitted.

Figure 2:
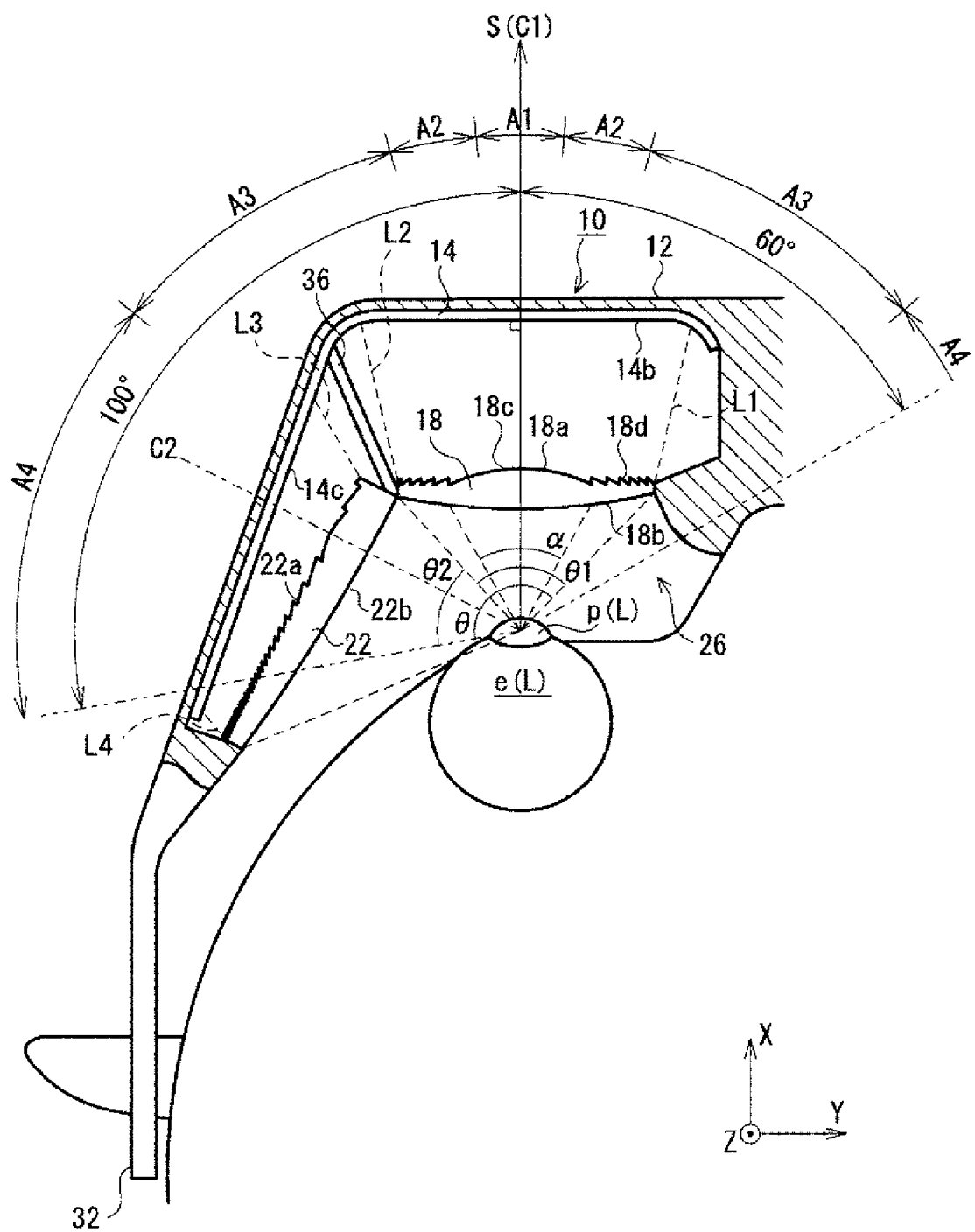
FIG. 2 is a view showing an optical system, for a left eye, of the head-mounted display device when a gaze of the viewer is directed forward.
Figure 3:
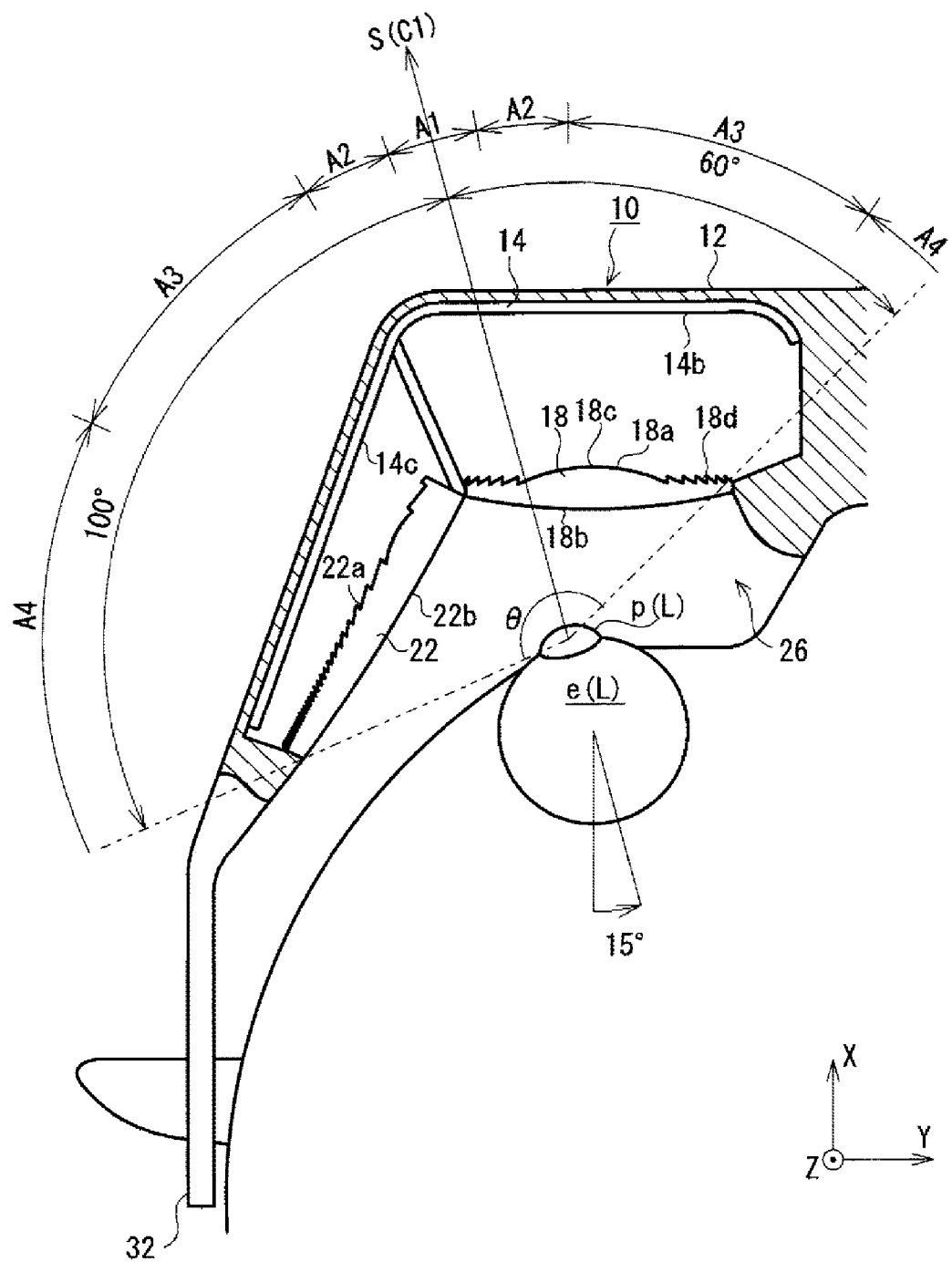
FIG. 3 is a view showing the optical system, for the left eye, of the head-mounted display device when the gaze of the viewer is directed diagonally forward.

FIGS. 2 and 3 show the optical system for the left eye in display device 10. FIG. 2 shows that the viewer is gazing forward (X-axis direction) and FIG. 3 shows that the viewer is gazing diagonally and outwardly forward (a horizontal direction inclined at about 15 degrees with respect to the X axis).

As shown in FIG. 2, display 14 and lens array 26 for the left eye (first eyepiece 18 and second eyepiece 22) are disposed in front of eyeball e(L) of the viewer.

Note that, in the present specification, positions of the respective components of display device 10 may be described based on the position of the eyeball (or the pupil) of the viewer as described above. In that case, the positions of the components are based on the position of the eyeball of the viewer when display device 10 is appropriately worn on the head of the viewer. Therefore, display device 10 is designed to be appropriately worn on the head of the viewer, that is, to be appropriately positioned with respect to the head. For example, display device 10 has nose pad 30 that can fit the nose of the viewer and ear pads 32 and 34 that can be hung on the ears, as shown in FIG. 1.

Figure 4:
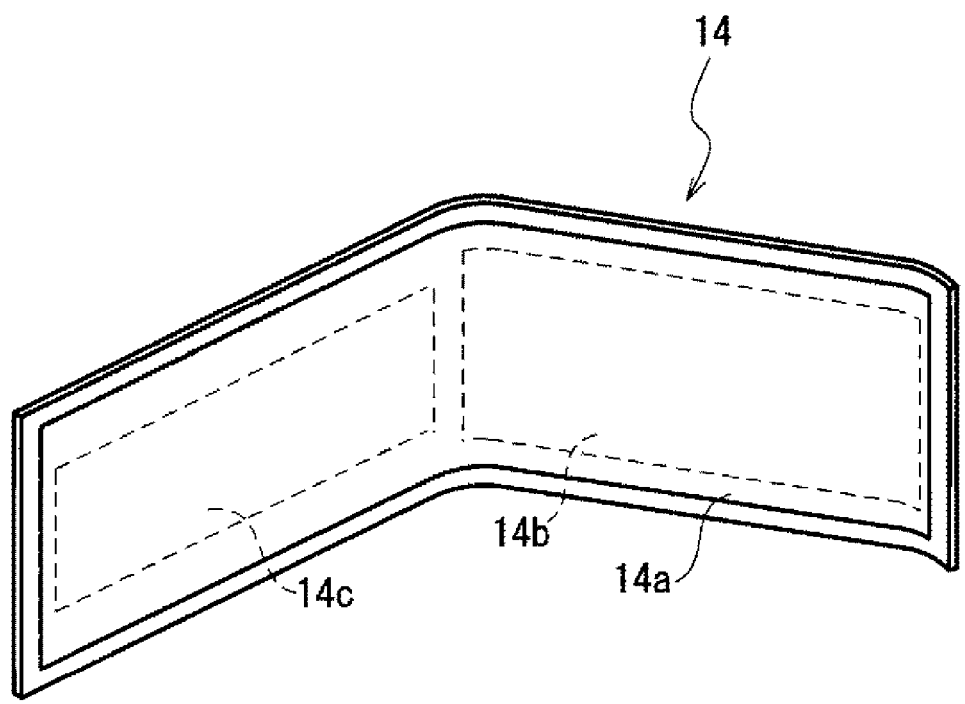
FIG. 4 is a schematic perspective view of a display.

In the present exemplary embodiment, display 14 is a band-shaped curved liquid crystal display curved in the horizontal direction (on the horizontal plane (X-Y plane)) as shown in FIG. 4. Display 14 has display screen 14a in which an image is to be displayed. Display screen 14a has first display region (first display portion) 14b for displaying a first image which is to be projected onto first eyepiece 18, and second display region (second display portion) 14c for displaying a second image which is to be projected onto second eyepiece 22. This will be described in detail later. According to the configuration described above, the first and second images are displayed in different positions of display screen 14a. Note that display 14 may be a flexible liquid crystal display having flexibility. Further, display 14 is not limited to a liquid crystal display, and may be an organic light emitting diode (OLED) display.

As shown in FIG. 2, first display region 14b of display 14 is disposed in front of pupil p(L) of eyeball e(L) of the viewer gazing forward, while facing pupil p(L). In the present exemplary embodiment, first display region 14b of display screen 14a is located substantially perpendicular to gaze direction S of eyeball e(L) gazing forward.

On the other hand, second display region 14c of display 14 is disposed diagonally and outwardly in front of pupil p(L) of eyeball e(L) of the viewer gazing forward relative to the horizontal direction, while facing pupil p(L). In the present exemplary embodiment, second display region 14c is located substantially perpendicular to a direction inclined horizontally outward (to the ear side) at an angle of 70 degrees with respect to gaze direction S of eyeball e(L) of the viewer gazing forward.

As shown in FIG. 2, first eyepiece 18 of lens array 26 for the left eye is disposed between first display region 14b of display 14 and pupil p(L) of eyeball e(L) of the viewer. Thus, first eyepiece 18 enlarges the first image displayed in first display region 14b and projects the enlarged first image onto pupil p(L).

In the present exemplary embodiment, first eyepiece 18 is also disposed such that optical axis C1 of first eyepiece 18 is substantially parallel to, specifically, substantially coincides with gaze direction S of eyeball e(L) of the viewer gazing forward. That is, optical axis C1 of first eyepiece 18 is substantially perpendicular to first display region 14b of display screen 14a. Although display 14 shown in FIG. 2 is partly flat, it is not limited thereto. Display 14 may entirely have a curved surface (the detail will be described later).

In the present specification, the "optical axis" of a lens indicates an axis which coincides with a straight line connecting a focal point (rear-side focal point) where parallel light perpendicularly entering a front-side lens surface (display-side lens surface) and passing through the lens is focused on a rear-side lens surface (viewer-side lens surface) side and a focal point (front-side focal point) where parallel light perpendicularly entering a rear-side lens surface and passing through the lens is focused on a front-side lens surface side.

Meanwhile, second eyepiece 22 of lens array 26 for the left eye is disposed between second display region 14c of display 14 and pupil p(L) of eyeball e(L) of the viewer. Thus, second eyepiece 22 enlarges the second image displayed in second display region 14c and projects the enlarged second image onto pupil p(L).

Second eyepiece 22 is disposed such that optical axis C2 of second eyepiece 22 is inclined outward with respect to optical axis C1 of first eyepiece 18 at an angle ranging from 30 degrees to 80 degrees inclusive, for example. In the present exemplary embodiment, the angle between optical axis C1 of first eyepiece 18 and optical axis C2 of second eyepiece 22 is about 60 degrees. Further, optical axis C2 of second eyepiece 22 is not perpendicular to second display region 14c of display screen 14a, the reason of which will be described later.

In the present exemplary embodiment, optical axes C1 and C2 of first eyepiece 18 and second eyepiece 22 for the left eye are on the substantially same plane (X-Y plane) along with optical axes of first eyepiece 20 and second eyepiece 24 for the right eye. In the present exemplary embodiment, optical axis C1 of first eyepiece 18 and optical axis C2 of second eyepiece 22 intersect with each other at pupil p(L) of eyeball e(L).

Both ends of first display region 14b of display 14 are on opposite sides across optical axis C1 of first eyepiece 18 with respect to light rays L1 and L2 passing through ends of display-side lens surface 18a of first eyepiece 18 from pupil p(L) of the viewer. Both ends of second display region 14c of display 14 are on opposite sides across optical axis C2 of second eyepiece 22 with respect to light rays L3 and L4 passing through ends of display-side lens surface 22a of second eyepiece 22 from pupil p(L) of the viewer.

In addition, the end of first display region 14b closer to second display region 14c of display 14 and the end of second display region 14c closer to first display region 14b of display 14 are between optical path L2 passing through the end of first eyepiece 18 closer to second eyepiece 22 from pupil p(L) of the viewer and optical path L3 passing through the end of second eyepiece 22 closer to first eyepiece 18 from pupil p(L).

Due to first eyepiece 18 and second eyepiece 22 of lens array 26 for the left eye thus configured, the first and second images displayed in first display region 14b and second display region 14c of display 14, respectively, are projected on the retina of eyeball e(L) such that they are horizontally continuous (connected to each other).

As shown in FIG. 2, a space (a light propagation space between first display region 14b and first eyepiece 18) where light directed to first eyepiece 18 from first display region 14b of display 14 propagates and a space (a light propagation space between second display region 14c and second eyepiece 22) where light directed to second eyepiece 22 from second display region 14c propagates are separated from each other. Specifically, both spaces are separated from each other by light shielding plate 36. Specifically, light shielding plate 36 is disposed in a region between optical path L2 passing through the end of first eyepiece 18 closer to second eyepiece 22 from pupil p(L) of the viewer and optical path L3 passing through the end of second eyepiece 22 closer to first eyepiece 18 from pupil p(L). This configuration prevents a portion of light emitted from first display region 14b from entering second eyepiece 22 and prevents a portion of light emitted from second display region 14c from entering first eyepiece 18, for example. Accordingly, the viewer can see a satisfactory first image through first eyepiece 18 and a satisfactory second image through second eyepiece 22.

Lens array 26 for the left eye (first eyepiece 18 and second eyepiece 22) is also designed for use based on visual properties of the viewer, that is, humans. Therefore, visual properties of humans will be described as a preliminary preparation for the detailed description of lens array 26.

Figure 5:
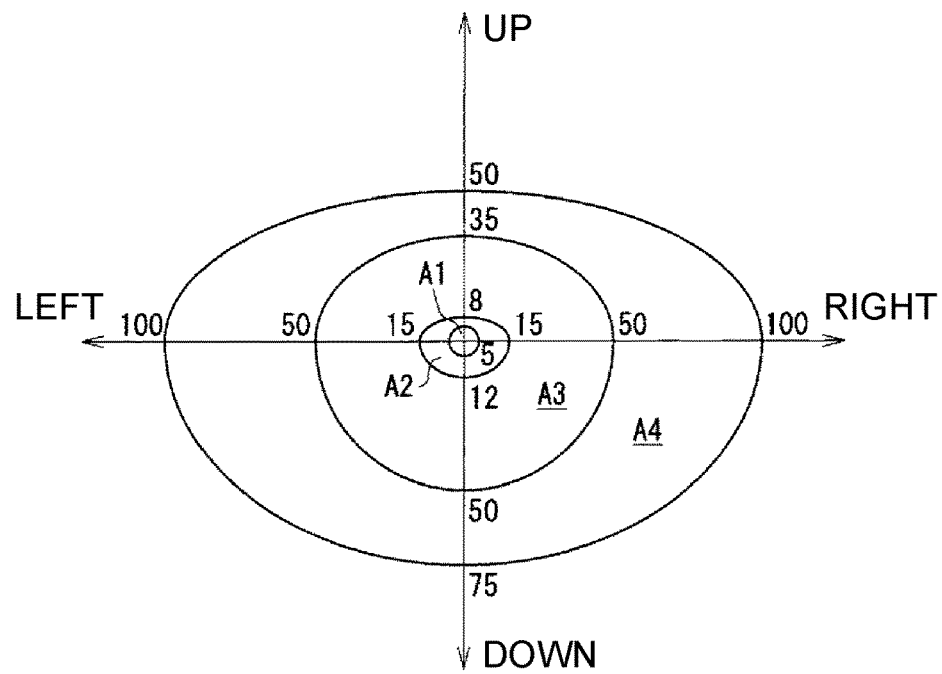
FIG. 5 is a diagram for describing a visual field of a human.

FIG. 5 shows a binocular visual field of humans. As shown in FIG. 5, the human binocular visual field spans about 200 degrees horizontal (about 100 degrees in each of left and right sides), and about 125 degrees vertical (about 50 degrees upward and about 75 degrees downward). Note that an object near the boundary of the visual field in the horizontal direction is recognized only by a single eye, not by both eyes. Specifically, the horizontal monocular visual field spans about 60 degrees toward the nose and about 100 degrees toward the ear (outward).

The binocular visual field is roughly classified into four zones based on human capability of identifying information. It is classified into discriminative visual field A1 in the center of the visual field, effective visual field A2 around discriminative visual field A1, induced visual field A3 around effective visual field A2, and auxiliary visual field A4 around induced visual field A3, in descending order according to the capability of identifying information.

Discriminative visual field A1 in the center of the visual field is about 5 degrees around the center, and in this visual field, humans exhibit the highest capability of identifying information regarding vision and color discrimination.

Effective visual field A2 around discriminative visual field A1 is about 15 degrees in each side in the horizontal direction, about 8 degrees upward, and about 12 degrees downward. In this zone, humans can instantaneously catch an object in front of them only by moving eyes (without moving their heads).

Induced visual field A3 around effective visual field A2 is about 50 degrees in each side in the horizontal direction, about 35 degrees upward, and about 50 degrees downward. In this zone, humans can identify only the presence of an object in front of them. This zone affects human sense of space coordinates, that is, causes a wide-field effect such as three-dimensional effect or sense of realism.

Outmost auxiliary visual field A4 around induced visual field A3 is a zone where humans have extremely low perception of an object presented to them and can notice only the presence of strong stimulus.

Figure 6:
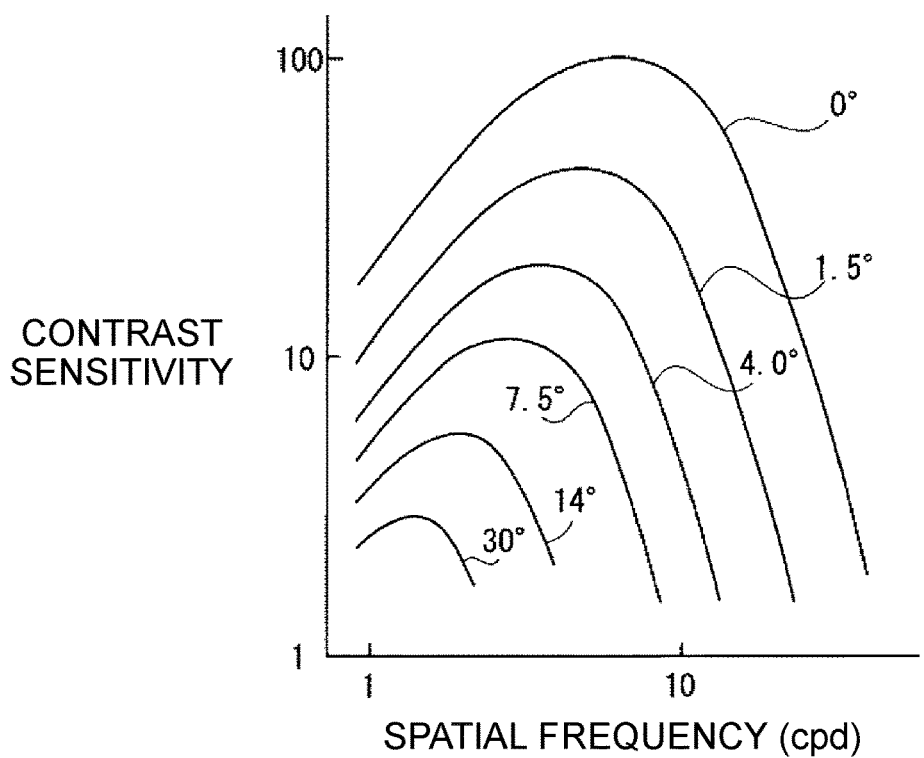
FIG. 6 is a diagram showing a human capability of identifying information regarding visual sense.

FIG. 6 is a diagram showing resolution characteristics at a plurality of horizontal positions (angular positions) on the nose side relative to the eyes of humans.

As shown in FIG. 6, humans can perceive a stripe pattern having high spatial frequency and low contrast in the center (0 degree) of the visual field. However, the recognizable maximum spatial frequency decreases by half in the visual field of 1.5 degrees away from the center. In the visual field of 30 degrees away from the center, the maximum spatial frequency is reduced to about one-twentieth.

Based on the visual properties shown in FIGS. 5 and 6, it is found that the resolution (maximum spatial frequency) of a recognizable image is reduced in the visual field outside of effective visual field A2 which is about 30 degrees (about 15 degrees in each side), as compared to that within effective visual field A2. Therefore, it is understood that the need to ideally focus an object present within the visual field exceeding about 30 degrees on the retina of the eyeball of the viewer is low.

In consideration of the visual properties described above, lens array 26 for the left eye (that is, first eyepiece 18 and second eyepiece 22) is configured as described below.

First, as shown in FIG. 2, lens array 26 for the left eye (that is, first eyepiece 18 and second eyepiece 22) is disposed within a visual field of 160 degrees of eyeball e(L) alone that is gazing forward (a range extending to about 100 degrees outward and about 60 degrees on the nose side). For eyeball e(L) gazing forward, observation field angle θ of lens array 26 for the left eye is about 150 degrees. In such observation field angle θ, observation field angle θ1 of first eyepiece 18 is about 90 degrees, and observation field angle θ2 of second eyepiece 22 is about 60 degrees.

In the present specification, the "observation field angle" indicates an angle which is determined by the distance (eye relief) between a lens and a pupil and at which the lens can focus an image onto a retina. Further, in the present specification, "focusing" indicates that an image having a shape similar to the shape of an image displayed on the display is formed onto a retina (that is, the viewer can see a clear image through a lens).

In the present exemplary embodiment, second eyepiece 22 of lens array 26 is provided to main body 12 so as to extend to the boundary of the visual field of about 100 degrees outward of eyeball e(L) gazing forward. In the present exemplary embodiment, a part of second eyepiece 22 is present outside the visual field over the boundary of the visual field of about 100 degrees outward. On the other hand, when gaze direction S is maximally inclined outward (inclined outward at about 15 degrees), second eyepiece 22 entirely falls within the visual field as shown in FIG. 3.

Observation field angle θ1 of first eyepiece 18 may be within a range from about 60 degrees to about 120 degrees inclusive (about 30 degrees or greater and about 60 degrees or less each on the outside and on the nose side). In addition, it is preferable that observation field angle θ1 of first eyepiece 18 is larger than observation field angle θ2 of second eyepiece 22. For example, ratio (θ2/θ1) of observation field angle θ2 of second eyepiece 22 to observation field angle θ1 of first eyepiece 18 is preferably less than 0.95. The reason is as follows. The viewer often gazes forward while using display device 10. Therefore, first eyepiece 18 is preferably disposed within at least discriminative visual field A1 and effective visual field A2 of eyeball e(L) gazing forward where the viewer can exhibit a high capability of identifying information. Thus, the boundary between the first image which is in first display region 14b and which can be seen through first eyepiece 18 and the second image which is in second display region 14c and which can be seen through second eyepiece 22 is outside effective visual field A2, so that the viewer is less likely to visually recognize the boundary (as compared to the case where the boundary is within effective visual field A2). If observation field angle θ1 is about 60 degrees, first eyepiece 18 is disposed within discriminative visual field A1, effective visual field A2, and a part of induced visual field A3 in the horizontal direction. If observation field angle θ1 is about 120 degrees, first eyepiece 18 is disposed within discriminative visual field A1, effective visual field A2, induced visual field A3, and a part of auxiliary visual field A4 in the horizontal direction.

Note that observation field angle θ1 of first eyepiece 18 is preferably equal to or larger than about 90 degrees such that first eyepiece 18 is present within discriminative visual field A1 and effective visual field A2 when gaze direction S is maximally inclined in the horizontal direction (when gaze direction S is inclined outward or toward the nose at about 15 degrees) as shown in FIG. 3. Thus, the boundary between the first image projected by first eyepiece 18 and the second image projected by the second eyepiece is present within induced visual field A3 outside effective visual field A2. Accordingly, the boundary between the first image and the second image is less likely to be noticeable by the viewer (as compared to the case where the boundary is within effective visual field A2). Consequently, the viewer can see the first image and the second image which are horizontally continuous as one image without having a feeling of strangeness.

Further, it is preferable that, to increase observation field angle θ1 of first eyepiece 18, paraxial radius of curvature R and rear-side focal length f of viewer-side lens surface 18b satisfy the inequality of 0<R/f<3.0. Thus, first eyepiece 18 can obtain large observation field angle θ1 without increasing the size in the radial direction (the direction perpendicular to the optical axis). In other words, display device 10 can be downsized.

Furthermore, the distance (eye relief) between viewer-side lens surface 18b of first eyepiece 18 and pupil p(L) of the viewer is preferably shorter than the distance (eye relief) between viewer-side lens surface 22b of second eyepiece 22 and pupil p(L). With this configuration, observation field angle θ1 of first eyepiece 18 can be set larger than observation field angle θ2 of second eyepiece 22 without increasing the radial size of first eyepiece 18.

Additionally, first eyepiece 18 and second eyepiece 22 are disposed such that an intersection point between optical axis C1 of first eyepiece 18 and optical axis C2 of second eyepiece 22 is at pupil p(L) of the viewer in FIG. 2, but the configuration is not limited thereto. For example, considering that pupil p(L) of the viewer moves in the horizontal direction as in FIG. 3, second eyepiece 22 may be disposed such that optical axis C2 of second eyepiece 22 passes over viewer's pupil p(L) moving in the horizontal direction. Further, first eyepiece 18 and second eyepiece 22 may also be disposed such that optical axis C1 of first eyepiece 18 and optical axis C2 of second eyepiece 22 are not on the same plane.

Figure 7:
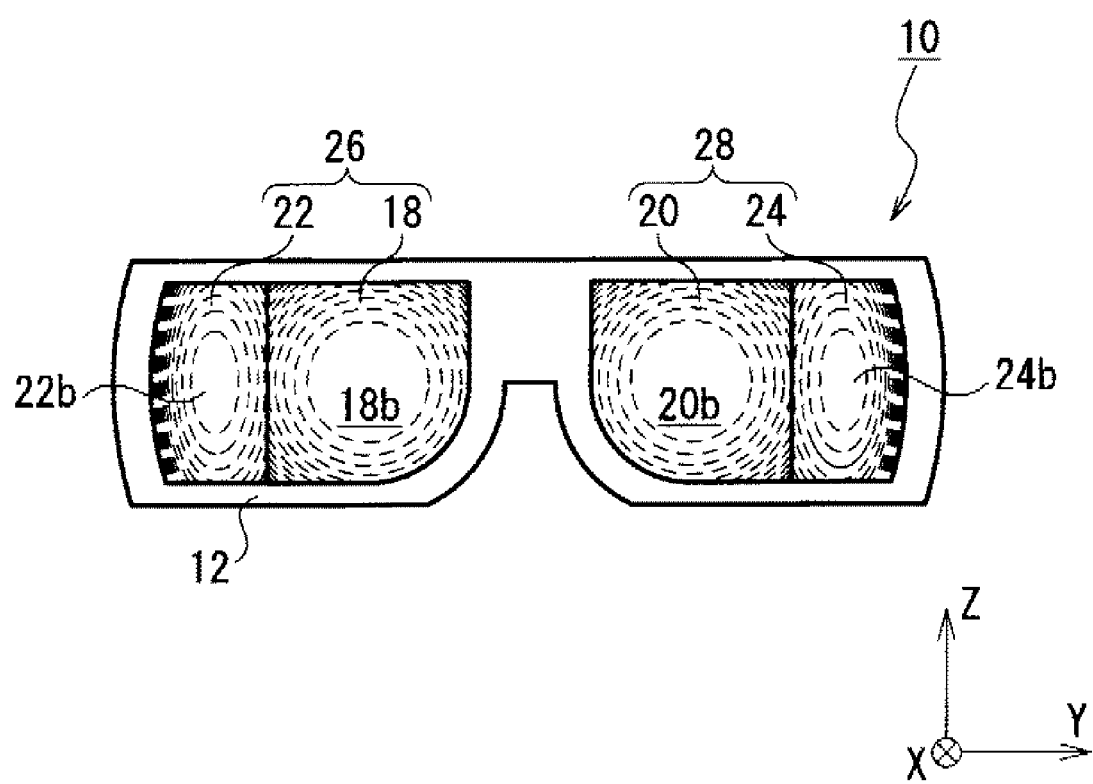
FIG. 7 is a view schematically showing the head-mounted display as viewed from a viewer side.
Figure 8A:
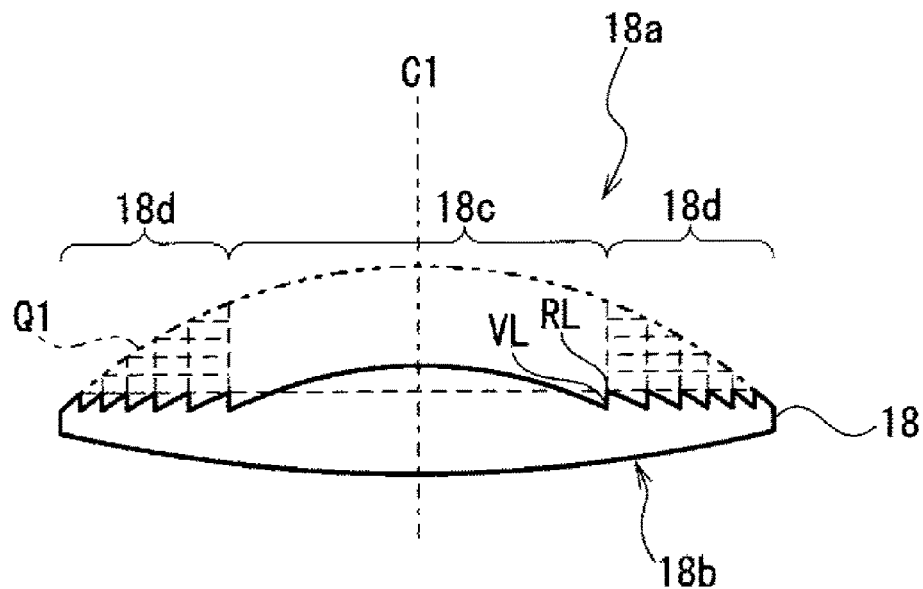
FIG. 8A is a side view of a first eyepiece.
Figure 8B:
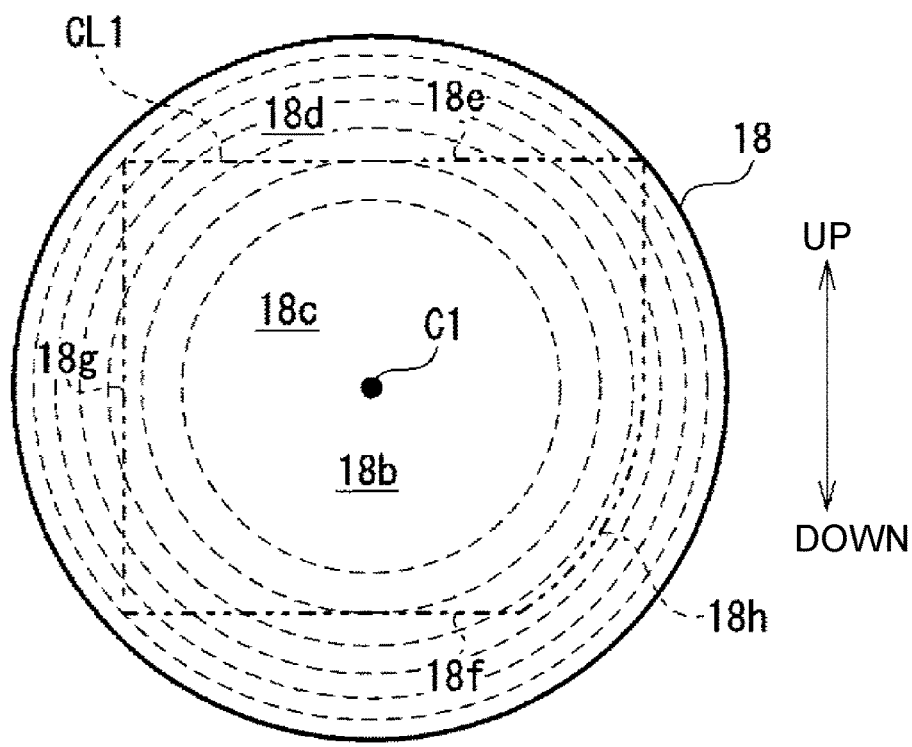
FIG. 8B is a plan view of the first eyepiece shown in FIG. 8A.
Figure 9A:
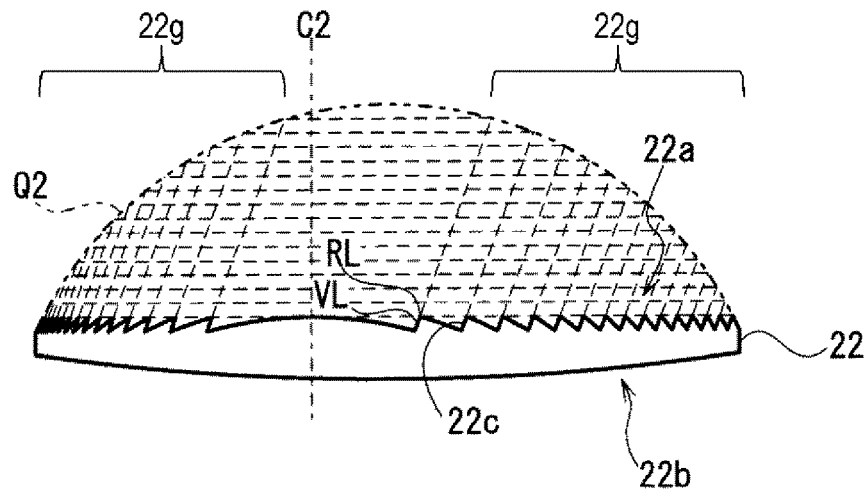
FIG. 9A is a side view of a second eyepiece.

FIG. 7 schematically shows display device 10 as viewed from the viewer side (viewed in the X-axis direction). Specifically, FIG. 7 shows lens array 26 for the left eye including a combination of first eyepiece 18 and second eyepiece 22 and lens array 28 for the right eye including a combination of first eyepiece 20 and second eyepiece 24. FIGS. 8A and 8B show first eyepiece 18, and FIGS. 9A and 9B show second eyepiece 22.

As shown in FIG. 7, lens array 26 for the left eye (first eyepiece 18 and second eyepiece 22) is disposed such that viewer-side lens surface 18b of first eyepiece 18 and viewer-side lens surface 22b of second eyepiece 22 are horizontally continuous in the entire visual field of the viewer in the vertical direction or in the central part of the visual field (for example, at least within discriminative visual field A1 and effective visual field A2 (about 20 degrees: about 8 degrees upward and about 12 degrees downward) in the vertical direction).

Figure 9B:
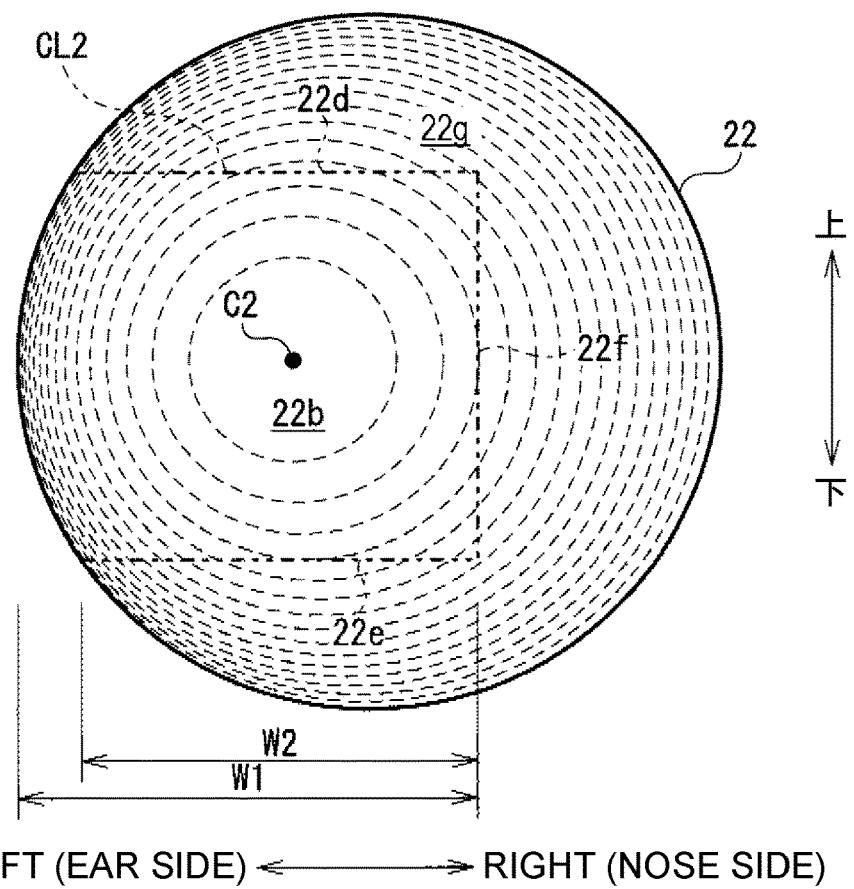
FIG. 9B is a plan view of the second eyepiece shown in FIG. 9A.

To this end, in the present exemplary embodiment, first eyepiece 18 and second eyepiece 22 are partly cut (have cut surfaces) as shown in FIGS. 8A to 9B, and first eyepiece 18 and second eyepiece 22 are in contact with each other at the cut surfaces. FIGS. 8B and 9B show cutting lines CL1 and CL2 for cutting first eyepiece 18 and second eyepiece 22. Although the wording "cutting" is used for convenience in the present exemplary embodiment, it is unnecessary that the eyepieces are manufactured by actually cutting a part thereof. For example, the eyepieces may be molded using a rotational asymmetric die to thereby obtain the shape described in the present embodiment.

Specifically, first eyepiece 18 is cut at its upper part, lower part, left part (ear side part), and right part (nose side part). Thus, first eyepiece 18 has upper cut surface 18e, lower cut surface 18f, left cut surface (that is, cut surface closer to second eyepiece 22) 18g, and right cut surface 18h.

On the other hand, second eyepiece 22 is cut at its upper part, lower part, and right part (nose side part). Thus, second eyepiece 22 has upper cut surface 22d, lower cut surface 22e, and right cut surface (that is, cut surface closer to first eyepiece 18) 22f.

As shown in FIGS. 9A and 9B, second eyepiece 22 is not cut at the left part (ear side part) distant from first eyepiece 18. Therefore, the left radial end surface, which is distant from first eyepiece 18 (which is opposite to right cut surface 22f), of second eyepiece 22 is curved. That is, second eyepiece 22 has a substantially D shape as viewed in the direction of optical axis C2. Accordingly, in second eyepiece 22, horizontal width W1 (lens diameter direction) in the center in the vertical direction is larger than horizontal width W2 at an upper end and a lower end. Thus, second eyepiece 22 can be configured to have a wide observation field angle in the horizontal direction, while being reduced in size by partial cutting.

As described above, first eyepiece 18 and second eyepiece 22 are cut and brought into contact with each other, whereby viewer-side lens surface 18b of first eyepiece 18 and viewer-side lens surface 22b of second eyepiece 22 can be continuously connected to each other in the horizontal direction in the entire vertical visual field of the viewer or at the central part of the visual field as viewed from the viewer. Specifically, a contour shape of viewer-side lens surface 18b of first eyepiece 18 and a contour shape of viewer-side lens surface 22b of second eyepiece 22 have joint shape parts which are in contact with each other such that viewer-side lens surface 18b and viewer-side lens surface 22b are continuously connected to each other in the horizontal direction in the entire vertical visual field or at the central part of the visual field of the viewer. That is, a side between viewer-side lens surface 18b of first eyepiece 18 and left cut surface 18g and a side between viewer-side lens surface 22b of second eyepiece 22 and right cut surface 22f function as the joint shape parts.

Thus, even if gaze direction S varies in the vertical direction, the viewer can see the first image transmitted through first eyepiece 18 and the second image transmitted through second eyepiece 22 as being continuous in the horizontal direction, that is, as one image, without having a feeling of strangeness.

As shown in FIGS. 8A to 9B, upper parts and lower parts of first eyepiece 18 and second eyepiece 22, that is, parts outside the vertical visual field of the viewer as viewed from the viewer (in the present exemplary embodiment, visual field of about 90 degrees) are cut off. Thus, first eyepiece 18 and second eyepiece 22 can be reduced in weight and size. Consequently, reduction in weight and reduction in size of display device 10 can be achieved.

In the present exemplary embodiment, cut surface 18g (first radial end surface) of first eyepiece 18 closer to second eyepiece 22 is not parallel to but inclined with respect to optical axis C1. Similarly, right cut surface 22f (second radial end surface) of second eyepiece 22 closer to first eyepiece 18 is also not parallel to but inclined with respect to optical axis C2. The reason will be described with reference to FIGS. 10 and 11.

Figure 10:
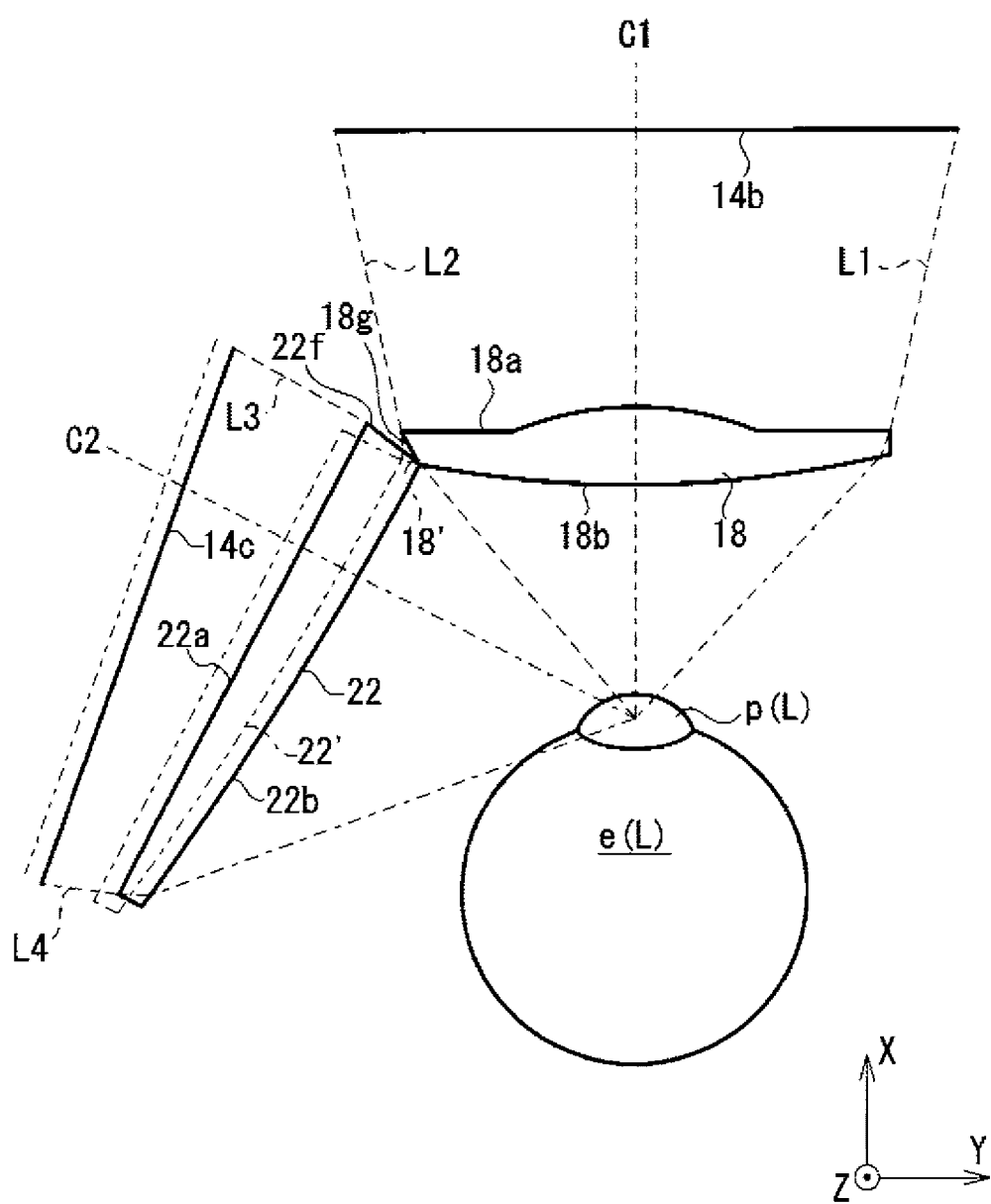
FIG. 10 is a schematic view showing a cut surface of the first eyepiece and a cut surface of the second eyepiece in the first exemplary embodiment.

FIG. 10 is a schematic view showing cut surface 18g of first eyepiece 18 and right cut surface 22f of second eyepiece 22 in the present exemplary embodiment. On the other hand, FIG. 11 is a schematic view showing cut surface 18g' of first eyepiece 18' and cut surface 22f' of second eyepiece 22' in a comparative example.

Figure 11:
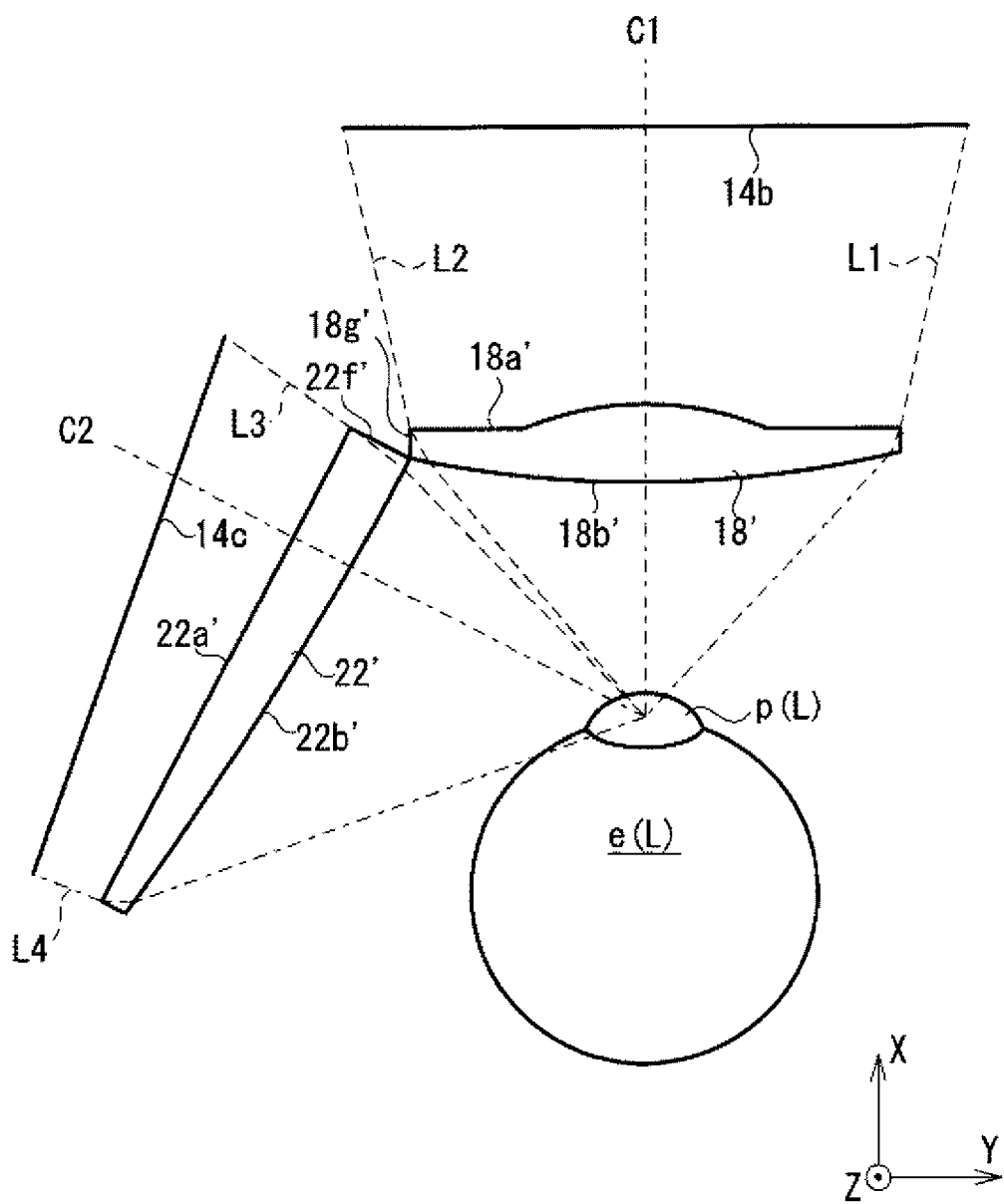
FIG. 11 is a schematic view showing a cut surface of a first eyepiece and a cut surface of a second eyepiece in a comparative example.

First, in the comparative example, cut surface 18g' of first eyepiece 18' is parallel to optical axis C1, and cut surface 22f' of second eyepiece 22 is parallel to optical axis C2, as shown in FIG. 11. In addition, viewer-side lens surface 18b' of first eyepiece 18' and viewer-side lens surface 22b' of second eyepiece 22' are continuous.

As shown in FIG. 11, light ray L2 emitted from first display region 14b enters an end of display-side lens surface 18a' of first eyepiece 18', the end being closer to second eyepiece 22'. However, due to refraction, light ray L2 does not emit from an end of viewer-side lens surface 18b', the end being closer to second eyepiece 22'. That is, a light ray from first display region 14b does not pass through a part of first eyepiece 18' present between cut surface 18g' and light ray L2.

Similarly, light ray L3 emitted from second display region 14c enters an end of display-side lens surface 22a' of second eyepiece 22', the end being closer to first eyepiece 18'. However, due to refraction, light ray L3 does not emit from an end of viewer-side lens surface 22b', the end being closer to first eyepiece 18'. That is, a light ray from second display region 14c does not pass through a part of second eyepiece 22' present between cut surface 22f' and light ray L3.

First eyepiece 18 and second eyepiece 22 shown in FIG. 10 according to the present exemplary embodiment are obtained by cutting such parts through which the light ray does not pass.

As shown in FIG. 10, cut surface 18g of first eyepiece 18 is inclined with respect to optical axis C1 to extend along light ray L2. That is, cut surface 18g is formed to extend along light ray L2 by cutting first eyepiece 18. Thus, light ray L2 enters an end of display-side lens surface 18a of first eyepiece 18, the end being closer to second eyepiece 22, and is emitted from an end of viewer-side lens surface 18b, the end being closer to second eyepiece 22.

Similarly, right cut surface 22f of second eyepiece 22 is inclined with respect to optical axis C2 to extend along light ray L3. That is, right cut surface 22f is formed to extend along light ray L3 by cutting second eyepiece 22. Thus, light ray L3 enters an end of display-side lens surface 22a of second eyepiece 22, the end being closer to first eyepiece 18, and is emitted from an end of viewer-side lens surface 22b, the end being closer to first eyepiece 18.

As shown in FIG. 10, a part of first eyepiece 18 which is closer to second eyepiece 22 and through which the light ray does not pass and a part of second eyepiece 22 which is closer to first eyepiece 18 and through which the light ray does not pass are removed. Accordingly, second eyepiece 22 can be brought closer to eyeball e(L) of the viewer, as compared to a configuration where such parts are not removed (second eyepiece 22' indicated by a dot-dot-dash line in the comparative example). Thus, second display region 14c for projecting the second image onto second eyepiece 22 can also be brought closer to eyeball e(L). In addition, first eyepiece 18 and second eyepiece 22 can be downsized (as compared to the comparative example shown in FIG. 11). Consequently, size reduction of display device 10 can be achieved.

As shown in FIGS. 8A and 8B, first eyepiece 18 has a Fresnel lens portion on at least a part of display-side lens surface 18a in the present exemplary embodiment. In the present exemplary embodiment, first eyepiece 18 has convex lens portion 18c and Fresnel lens portion 18d on display-side lens surface 18a. First eyepiece 18 also has a convex lens portion on viewer-side lens surface 18b.

Specifically, convex lens portion 18c is disposed in the center of display-side lens surface 18a, and Fresnel lens portion 18d is disposed outside convex lens portion 18c. The optical axes of convex lens portion 18c and optical axis of Fresnel lens portion 18d coincide with optical axis C1 of first eyepiece 18. That is, display-side lens surface 18a of first eyepiece 18 has a rotationally symmetrical shape about optical axis C1.

In the present exemplary embodiment, convex lens portion 18c of first eyepiece 18 is present within discriminative visual field A1 and effective visual field A2 of eyeball e(L) gazing forward as shown in FIG. 2. For example, observation field angle α of convex lens portion 18c is less than or equal to 100 degrees. Therefore, Fresnel lens portion 18d outside convex lens portion 18c is present within induced visual field A3 outside effective visual field A2. The reason of such configuration is that, if Fresnel lens portion 18d is present within discriminative visual field A1 or effective visual field A2, a plurality of annular ridge lines RL and valley lines VL of Fresnel lens portion 18d shown in FIG. 8A may be noticeable by the viewer as annular fringes. This may reduce a sense of realism.

According to first eyepiece 18 described above, the first image displayed in first display region 14b of display 14 is enlarged and projected onto pupil p(L) of eyeball e(L) of the viewer. First eyepiece 18 has Fresnel lens portion 18d on at least a part thereof, whereby first eyepiece 18 can be made thinner, and thus, can be reduced in weight and size. For example, first eyepiece 18 can be made thinner than an eyepiece having convex lens portion Q1 optically equivalent to Fresnel lens portion 18d, and can be accordingly reduced in weight and size.

As shown in FIGS. 9A and 9B, second eyepiece 22 has a Fresnel lens portion on entire display-side lens surface 22a in the present exemplary embodiment. Second eyepiece 22 also has a convex lens portion on viewer-side lens surface 22b.

In the present exemplary embodiment, optical axis C2 of second eyepiece 22 is offset from the center of the contour shape of the lens surfaces (display-side lens surface 22a, viewer-side lens surface 22b) (before second eyepiece 22 is cut), as shown in FIGS. 9A and 9B.

This is for disposing a part of second eyepiece 22 closer to optical axis C2 to be closer to the center of the visual field (that is, closer to first eyepiece 18) where a high capability of identifying information is provided, when second eyepiece 22 is cut and disposed in display device 10. The part near optical axis C2 has less aberration than an outer peripheral part. Therefore, the part which has less aberration and is near optical axis C2 is located closer to first eyepiece 18 such that the second image displayed in second display region 14c can be seen by the viewer without a feeling of strangeness. Particularly, in the present exemplary embodiment, optical axis C2 of second eyepiece 22 is offset from the center of the contour shape of the lens surfaces to pass through pupil p(L) of eyeball e(L) of the viewer.

In addition, in the present exemplary embodiment, Fresnel lens portion 22g of second eyepiece 22 is not rotationally symmetrical about optical axis C2. Specifically described, centers of a plurality of annular ridge lines RL and valley lines VL of Fresnel lens portion 22g do not coincide with optical axis C2 of second eyepiece 22 as shown in FIG. 9A. Further, rising surfaces 22c between ridge lines RL and valley lines VL are not parallel to but inclined with respect to optical axis C2.

The reason why Fresnel lens portion 22g of second eyepiece 22 has such a rotationally asymmetrical shape will be described with reference to FIGS. 12 and 13.

Figure 12:
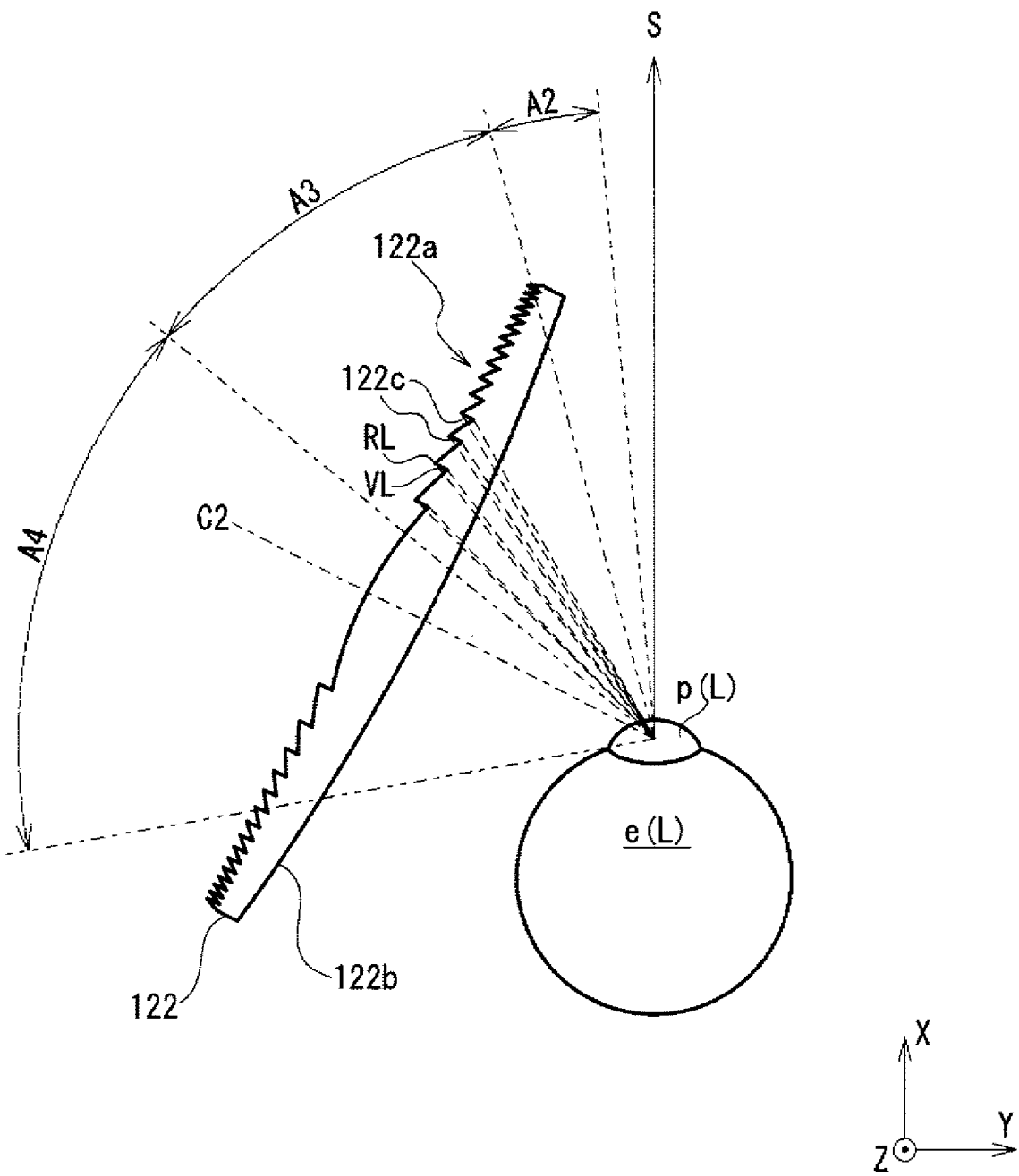
FIG. 12 is a view showing a Fresnel lens according to the comparative example.

FIG. 12 shows Fresnel lens 122 in a comparative example. Fresnel lens 122 shown in FIG. 12 in the comparative example has a rotationally symmetrical shape about optical axis C2, and has rising surfaces 122c parallel to optical axis C2. FIG. 13 shows second eyepiece 22 according to the present exemplary embodiment.

As shown in FIG. 12, when the viewer gazes forward, optical axis C2 of Fresnel lens 122 in the comparative example is inclined with respect to gaze direction S. That is, the viewer sees viewer-side lens surface 122b of Fresnel lens 122 diagonally. In that case, rising surfaces 122c of Fresnel lens 122 are directed to pupil p(L) in induced visual field A3 of eyeball e(L) gazing forward. Specifically, each of rising surfaces 122c is inclined with respect to a straight line connecting ridge line RL, valley line VL, and pupil e(L). Therefore, annular ridge lines RL and valley lines VL are projected onto the retina of eyeball e(L) as high-density annular fringes without overlapping each other, and the viewer is likely to notice such high-density annular fringes.

Figure 13:
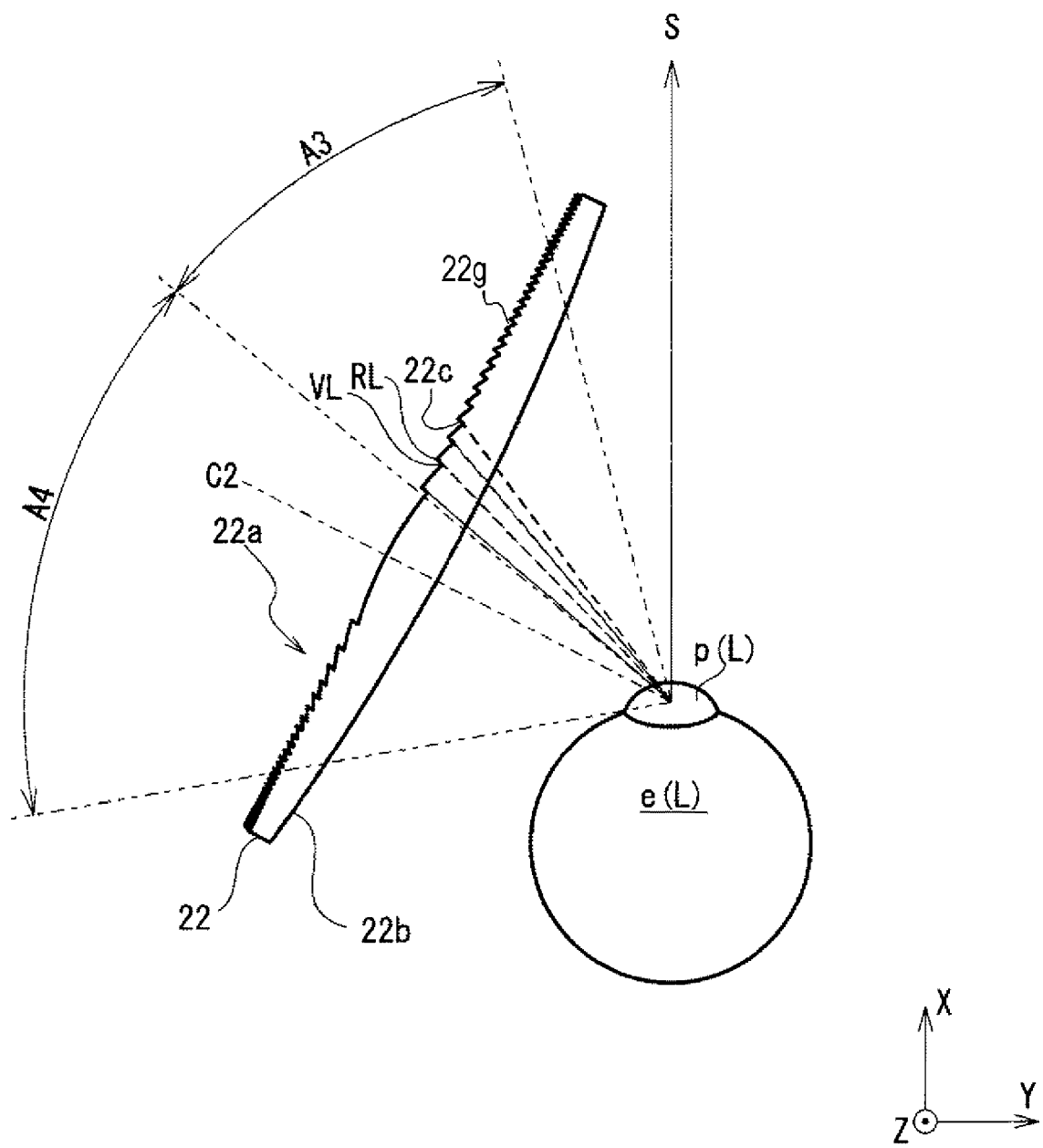
FIG. 13 is a view showing the second eyepiece according to the first exemplary embodiment.

On the other hand, in second eyepiece 22 in the present exemplary embodiment, rising surfaces 22c of Fresnel lens portion 22g are not really directed to pupil p(L) in an area of induced visual field A3 closer to auxiliary visual field A4 of eyeball e(L) gazing forward, as shown in FIG. 13. Specifically, rising surface 22c overlaps a straight line connecting ridge line RL, valley line VL, and pupil e(L) almost in parallel. That is, rising surfaces 22c in Fresnel lens portion 22g, closer to first eyepiece 18, of second eyepiece 22 are inclined with respect to optical axis C2 of second eyepiece 22 (Fresnel lens portion 22g of second eyepiece 22 has a rotationally asymmetrical shape) so as not to be directed to pupil p(L) gazing forward. Thus, annular ridge lines RL and valley lines VL overlap each other and are projected as low-density annular fringes on the retina of eyeball e(L), and therefore, the viewer is less likely to notice such low-density annular fringes.

As shown in FIG. 13, rising surfaces 22c of Fresnel lens portion 22g are not really directed to pupil p(L) in induced visual field A3, whereas rising surfaces 22c is directed to pupil p(L) in auxiliary visual field A4. However, the capability of identifying information of the viewer is lower in auxiliary visual field A4 than in induced visual field A3, and thus, annular ridge lines R(L) and valley lines V(L) are unnoticeable by the viewer in auxiliary visual field A4.

According to second eyepiece 22 described above, the second image displayed in second display region 14c of display 14 is enlarged and projected onto pupil p(L) of eyeball e(L) of the viewer. Second eyepiece 22 has Fresnel lens portion 22g on at least a part thereof, whereby second eyepiece 22 can be reduced in weight and size. For example, second eyepiece 22 can be reduced in weight and size as compared to an eyepiece having convex lens portion Q2 optically equivalent to Fresnel lens portion 22g as shown in FIG. 9A.

Moreover, a distance between first eyepiece 18 and first display region 14b of display 14 and a distance between second eyepiece 22 and second display region 14c are set based on the visual properties of the viewer, that is, humans, shown in FIGS. 5 and 6. This will be described with reference to FIG. 14.

Figure 14:
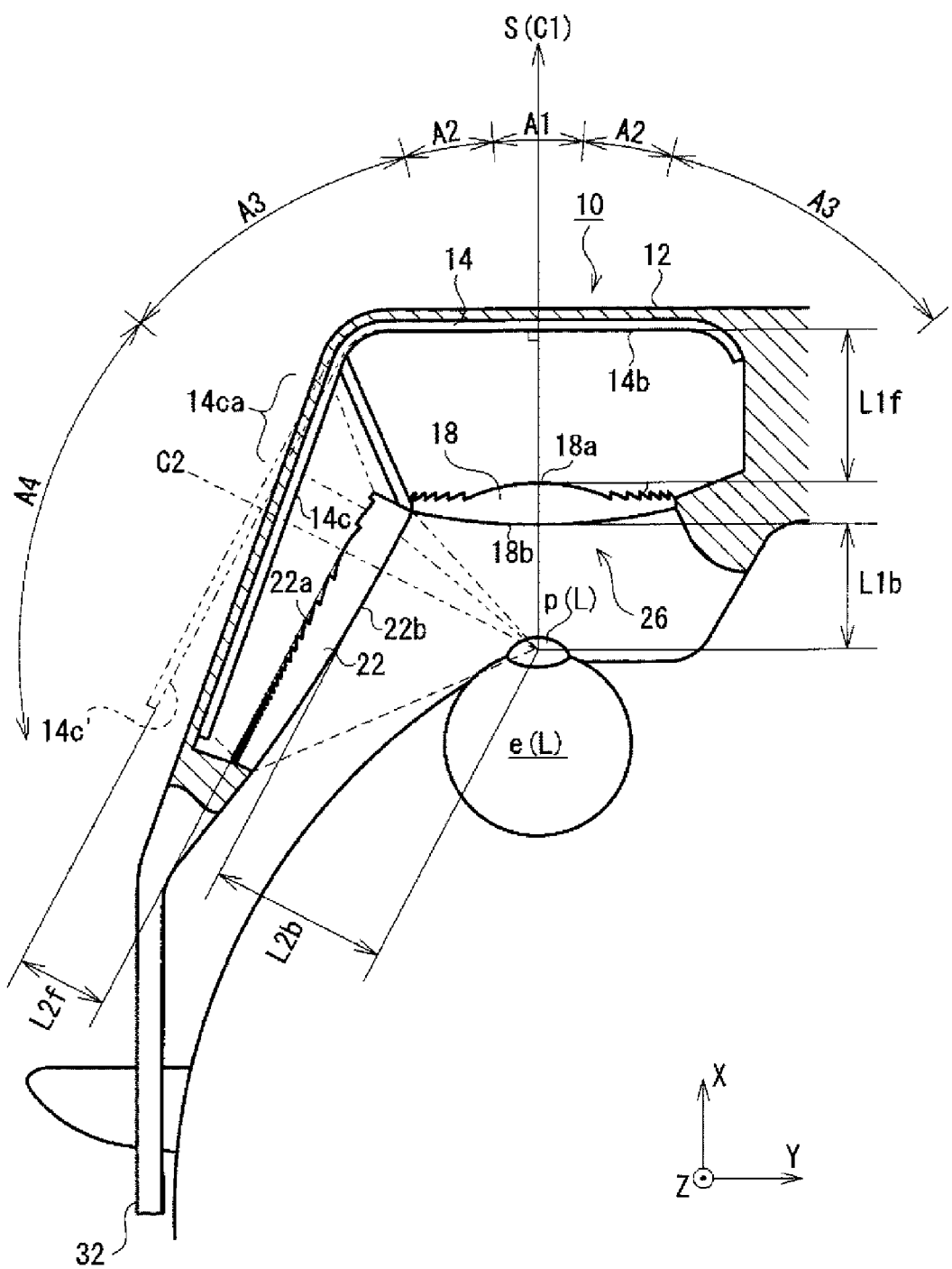
FIG. 14 is a view for describing a distance between the display and the eyepieces.

First, comparing the distance between first eyepiece 18 and first display region 14b of display 14 and the distance between second eyepiece 22 and second display region 14c, the latter is shorter than the former as shown in FIG. 14 in the present exemplary embodiment. That is, first eyepiece 18 and second eyepiece 22 have optical characteristics which are different from each other and which enable first eyepiece 18 and second eyepiece 22 to have such distances, respectively. Accordingly, the size, particularly the horizontal size, of display device 10 is reduced, which leads to reduction in weight of display device 10.

As shown in FIG. 14, optical axis C1 of first eyepiece 18 is almost perpendicular to first display region 14b of display 14. The distance between first eyepiece 18 and first display region 14b is distance L1f which is necessary for focusing the first image displayed in first display region 14b onto the retina of eyeball e(L) (necessary for the viewer to clearly see the first image). Distance L1f is determined based on distance Lib between first eyepiece 18 and pupil p(L) and the optical characteristic of first eyepiece 18.

Meanwhile, optical axis C2 of second eyepiece 22 is not perpendicular to second display region 14c of display 14. Specifically, second display region 14c is disposed such that a part distant from first display region 14b is closer to second eyepiece 22 than a part near first display region 14b is. The reason for this will be described.

In FIG. 14, second display region 14c' of display 14 according to a comparative example is indicated by a dot-dot-dash line. Optical axis C2 of second eyepiece 22 is perpendicular to display region 14c' of display 14 in the comparative example. The distance between second eyepiece 22 and second display region 14c' in the comparative example is distance L2f necessary for focusing the second image displayed in second display region 14c' in the comparative example onto the retina of eyeball e(L). Distance L2f is determined based on distance L2b between second eyepiece 22 and pupil p(L) and the optical characteristic of second eyepiece 22.

In the present exemplary embodiment, second display region 14c of display 14 is disposed with respect to second eyepiece 22 such that at least a part of second display region 14c is closer to second eyepiece 22 than second display region 14c' in the comparative example is. Specifically, at least a part of second display region 14c is present in an area closer to second eyepiece 22 than the position when the second image is focused on the retina of eyeball e(L) is.

In the present exemplary embodiment, in second display region 14c of display 14, a part closer to first display portion 14b, that is, part 14ca for projecting a part of the second image onto a part of second eyepiece 22 in induced visual field A3 of eyeball e(L) gazing forward, is mostly present at the position with distance L2f from second eyepiece 22. The other part (part distant from first display portion 14b), that is, the part for projecting the rest of the second image onto a part of second eyepiece 22 in auxiliary visual field A4, are present at the position closer to second eyepiece 22 with a distance shorter than distance L2f.

Therefore, the part of the second image displayed in the area distant from first display portion 14b is unclearly projected onto the retina of eyeball e(L) through the part of second eyepiece 22 within auxiliary visual field A4. However, the viewer (human) cannot clearly identify an object within auxiliary visual field A4 by nature, and thus, no problem occurs. Meanwhile, due to second display region 14c of display 14 being closer to second eyepiece 22, display device 10 can be reduced in the horizontal size, as compared to the configuration using second display region 14c' in the comparative example, whereby reduction in weight can be achieved.

In the present exemplary embodiment, a part of second eyepiece 22 is within induced visual field A3 of eyeball e(L) gazing forward as shown in FIG. 14. Therefore, second display region 14c of display 14 is partially located closer to second eyepiece 22 with a distance shorter than distance L2f between second display region 14c and second eyepiece 22 for focusing the second image onto the retina of eyeball e(L). However, if second eyepiece 22 is only within auxiliary visual field A4 (that is, if observation field angle θ1 of first eyepiece 18 is equal to or greater than 100 degrees (if first eyepiece 18 is within discriminative visual field A1, effective visual field A2, and induced visual field A3)), the configuration is not limited thereto. In such a case, second display region 14c displaying the second image to be projected to second eyepiece 22 present only within auxiliary visual field A4 may be entirely located closer to second eyepiece 22 with a distance shorter than distance L2f.

The optical system of display device 10 according to the present exemplary embodiment has been described above. Now, image processing regarding an image to be displayed on displays 14 and 16 will be described.

Figure 15:
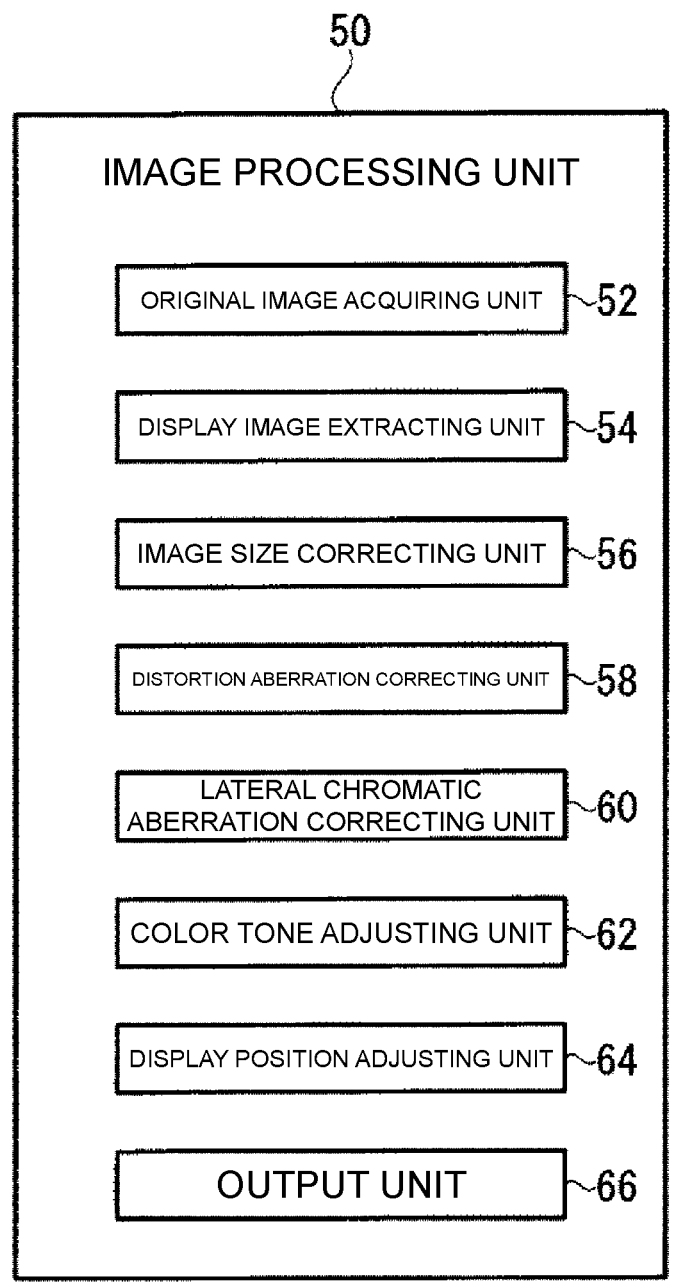
FIG. 15 is a diagram showing a configuration of an image processing unit of the head-mounted display device.

Display device 10 according to the present exemplary embodiment has image processing unit 50 shown in FIG. 15. Image processing unit 50 includes original image acquiring unit 52, display image extracting unit 54, image size correcting unit 56, distortion aberration correcting unit 58, lateral chromatic aberration correcting unit 60, color tone adjusting unit 62, display position adjusting unit 64, and output unit 66.

Image processing unit 50 is composed of at least a central processing unit (CPU), a memory, and a circuit board on which the CPU and the memory are mounted, for example. Programs for image processing and images are stored in the memory. The CPU and the memory function as the components from original image acquiring unit 52 to output unit 66 in image processing unit 50 by being operated according to programs. The respective components will be described.

Figure 16:
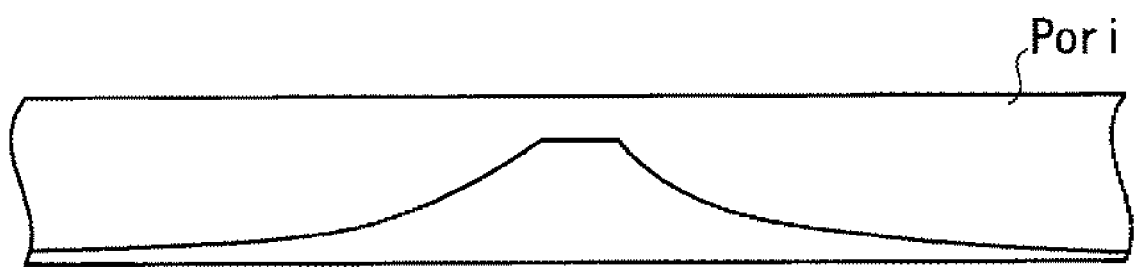
FIG. 16 is a view showing a 360-degree panorama image.

Original image acquiring unit 52 in image processing unit 50 acquires an original image, which is an original of an image to be presented to the viewer by display device 10, from an external device (not shown). For example, original image acquiring unit 52 acquires original image Pori which is a 360-degree panorama image from the external device as shown in FIG. 16. To this end, image processing unit 50 is connected to the external device via a high-definition multimedia interface (HDMI) (registered trademark) cable, for example.

Display image extracting unit 54 in image processing unit 50 extracts first and second images P1(L), P2(L), P1(R), and P2(R) to be displayed on displays 14 and 16, respectively, from original image Pori acquired by original image acquiring unit 52. That is, display image extracting unit 54 extracts first image P1(L) for the left eye to be displayed in first display region 14b of display 14 for the left eye, second image P2(L) for the left eye to be displayed in second display region 14c, first image P1(R) for the right eye to be displayed in first display region 16b of display 16 for the right eye, and second image P2(R) for the right eye to be displayed in second display region 16c in FIG. 1.

Figure 17:
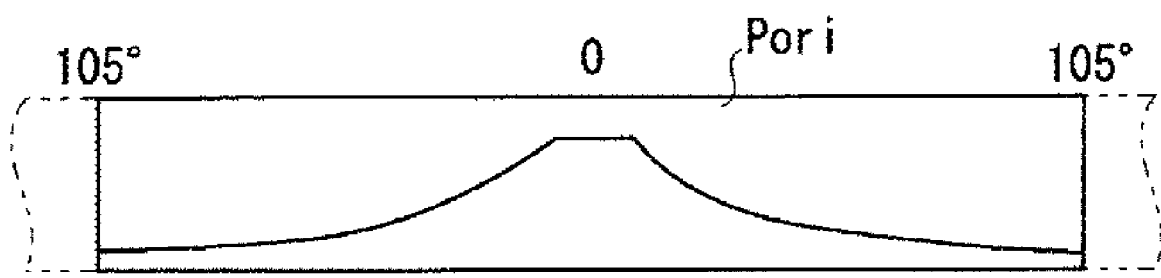
FIG. 17 is a view showing a region within a range of 210 degrees.
Figure 18:
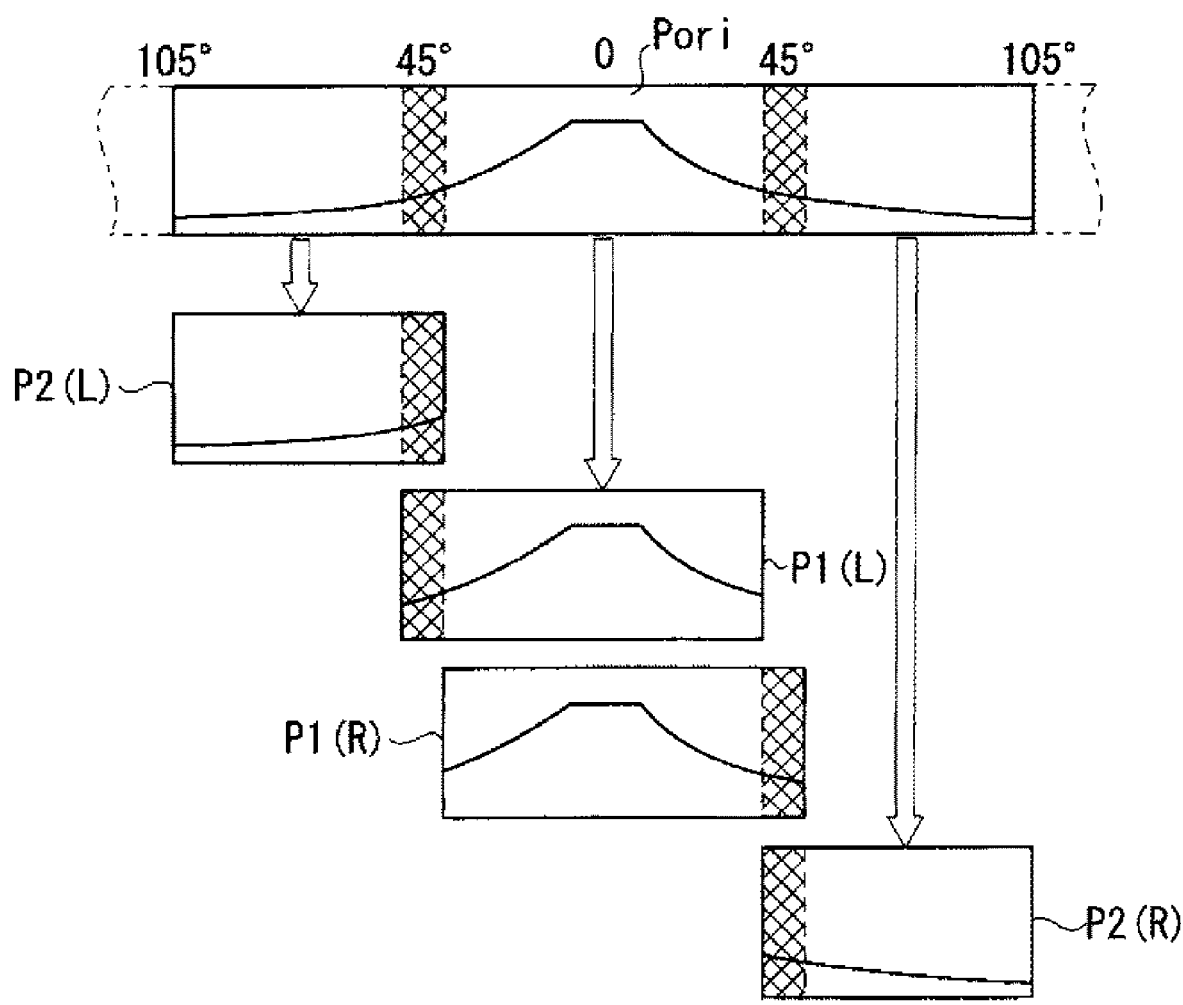
FIG. 18 is a view for describing extraction of first and second images to be displayed in the display.

Specifically, as shown in FIG. 18, display image extracting unit 54 firstly extracts first and second images P1(L) and P2(L) for the left eye and first and second images P1(R) and P2(R) for the right eye from a 210-degree area in 360-degree panorama image Pori as shown in FIG. 17. That is, it extracts images in the entire horizontal visual field of the viewer.

As shown in FIG. 18, first image P1(L) for the left eye and first image P1(R) for the right eye are displayed just in front of the left eye and just in front of the right eye, respectively, and are almost the same. Specifically, first image P1(L) for the left eye and first image P1(R) for the right eye are horizontally shifted from each other by a very small amount in light of a parallax such that they look natural for the viewer.

Display image extracting unit 54 in image processing unit 50 also extracts these four images from original image Pori such that the horizontal sizes of second images P2(L) and P2(R) which can be seen by the viewer through second eyepieces 22 and 24 are smaller than the horizontal sizes of first images P1(L) and P1(R) which can be seen by the viewer through first eyepieces 18 and 20.

In the present exemplary embodiment, display image extracting unit 54 extracts first images P1(L) for the left eye and P1(R) for the right eye with a size of an angular range of about 90 degrees and second images P2(L) for the left eye and P2(R) for the right eye with a size of an angular range of about 60 degrees. The angular range for first images P1(L) and P1(R) corresponds to observation field angle θ1 of about 90 degrees of first eyepieces 18 and 20, and the angular range for second images P2(L) and P2(R) corresponds to observation field angle θ2 of about 60 degrees of second eyepieces 22 and 24.

Thus, the boundary between first image P1(L) for the left eye and second image P2(L) for the left eye is located outside of (on the left side from) the center of the visual field where the capability of identifying information is high. Accordingly, the boundary is less likely to be visible to the viewer, as compared to a configuration where the angular range for second image P2(L) is larger than the angular range for first image P1(L). Similarly, the boundary between first image P1(R) for the right eye and second image P2(R) for the right eye is located outside of (on the right side from) the center of the visual field. Accordingly, the boundary is less likely to be visible to the viewer, as compared to a configuration where the angular range for second image P2(R) is larger than the angular range for first image P1(R).

Display image extracting unit 54 in image processing unit 50 also extracts first and second images P1(L) and P2(L) for the left eye from original image Pori such that images P1(L) and P2(L) have a common part (cross-hatched part) as shown in FIG. 18. Display image extracting unit 54 in image processing unit 50 also extracts first and second images P1(R) and P2(R) for the right eye from original image Pori such that images P1(R) and P2(R) have a common part (cross-hatched part). The reason for this will be described with reference to FIGS. 19A to 20C, taking first and second images P1(L) and P2(L) for the left eye as an example.

Figure 19A:
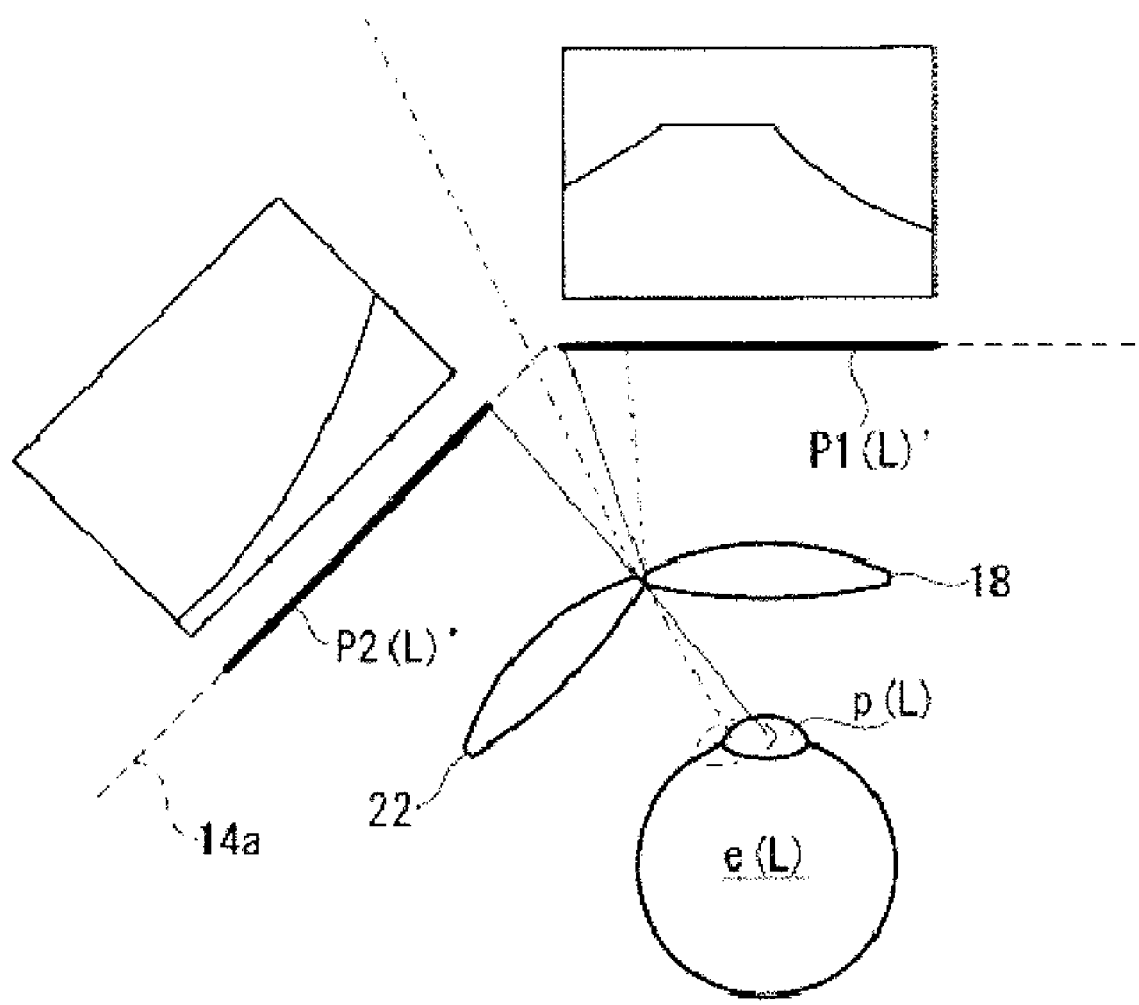
FIG. 19A is a view showing how first and second images are seen in the comparative example.
Figure 19B:
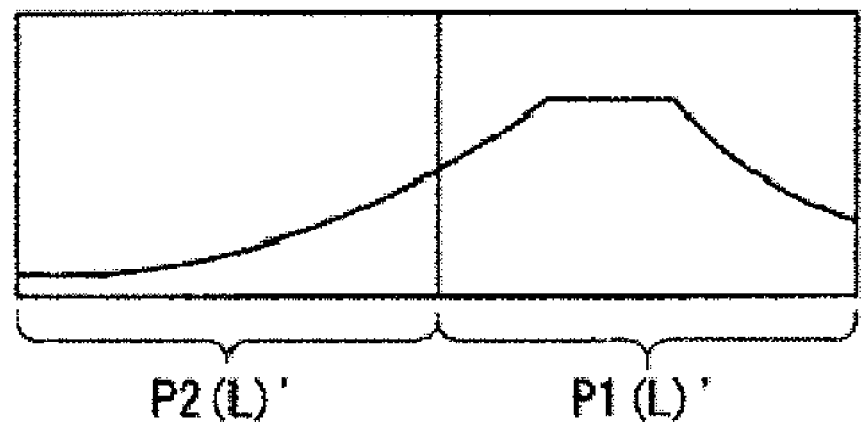
FIG. 19B is a view showing how first and second images are seen in the comparative example.
Figure 19C:
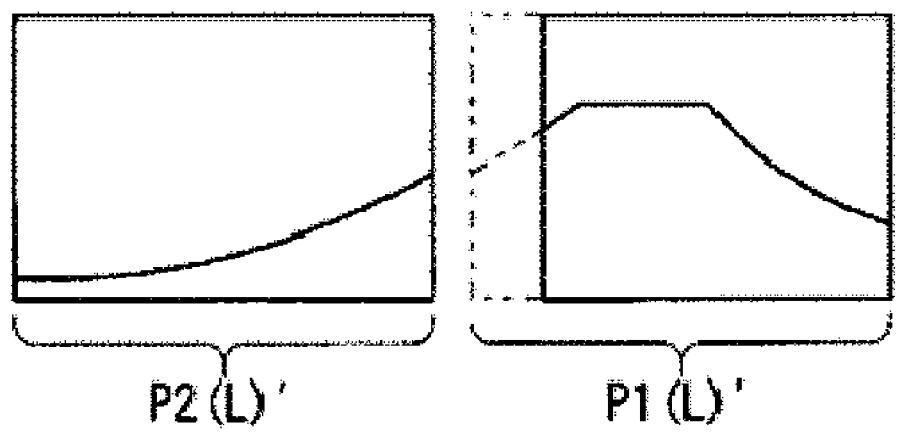
FIG. 19C is a view showing how first and second images are seen in the comparative example.
Figure 20A:
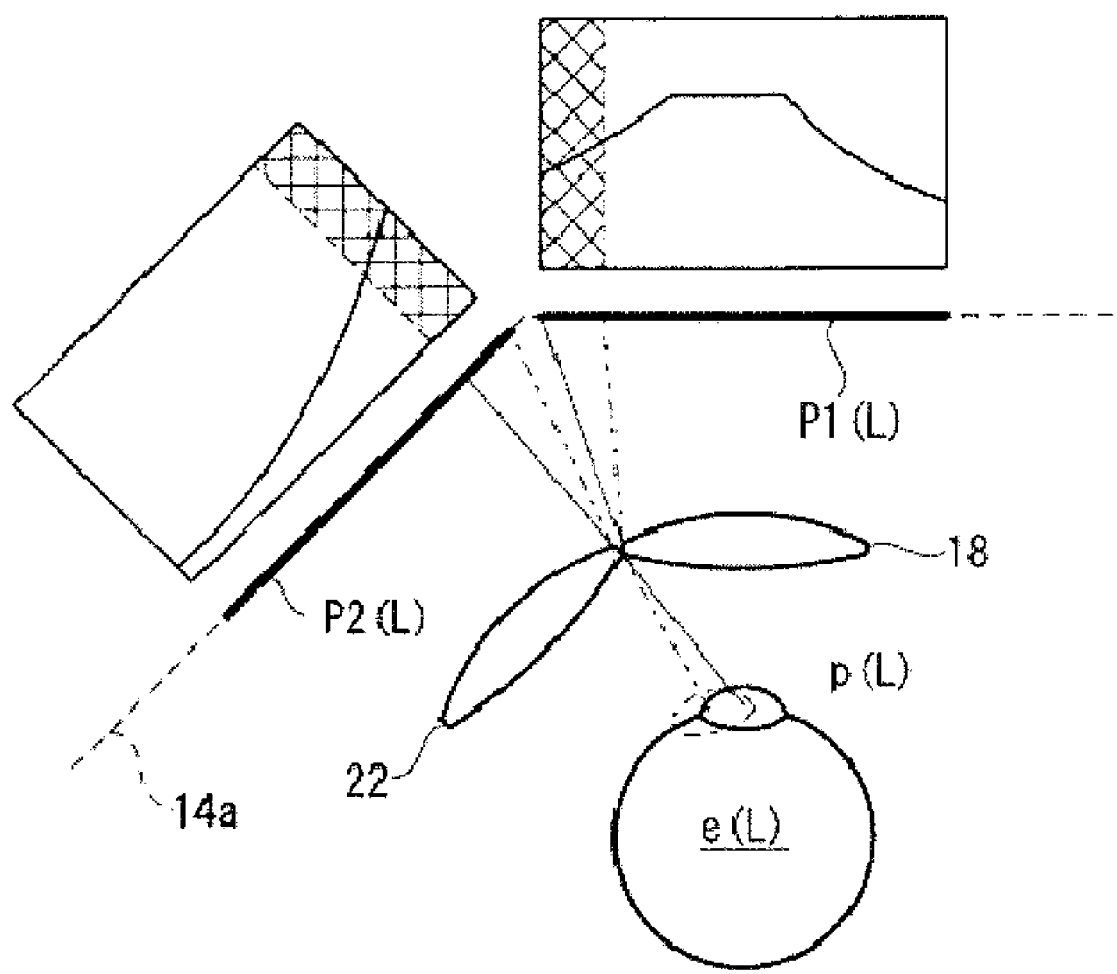
FIG. 20A is a view showing how first and second images are seen in the first exemplary embodiment.
Figure 20B:
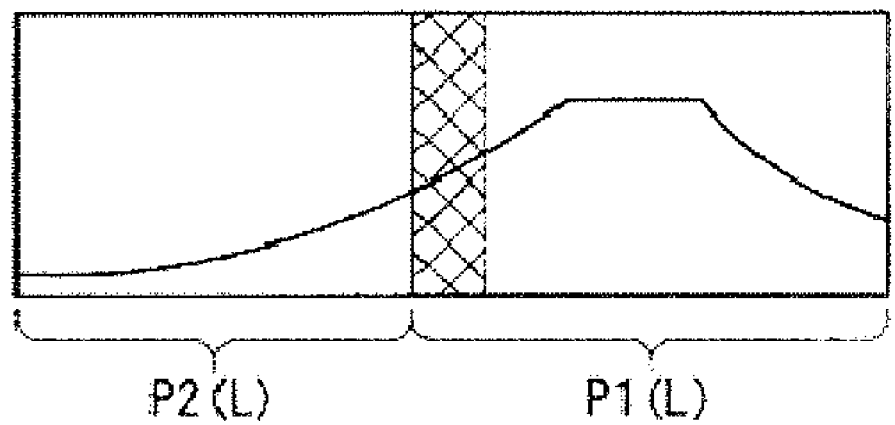
FIG. 20B is a view showing how first and second images are seen in the first exemplary embodiment.
Figure 20C:
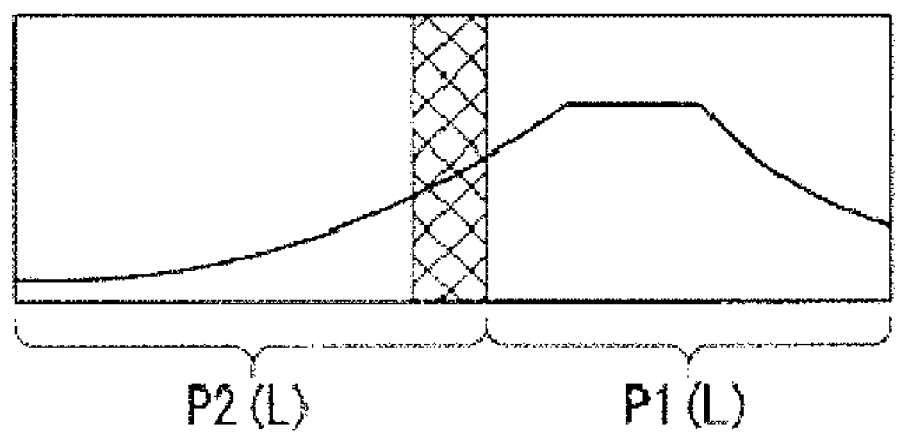
FIG. 20C is a view showing how first and second images are seen in the first exemplary embodiment.

FIGS. 19A to 19C show first and second images P1(L)' and P2(L)' for the left eye having no common part in a comparative example. Meanwhile, FIGS. 20A to 20C show first and second images P1(L) and P2(L) for the left eye which are partly common according to the present exemplary embodiment.

FIG. 19A shows a positional relationship among first and second images P1(L)' and P2(L)', first and second eyepieces 18 and 22, and eyeball e(L). When gazing forward (solid line), the viewer can see first image P1(L)' and second image P2(L)' such that they are continuous as shown in FIG. 19B.

When directing his/her gaze to diagonally front (dot-dot-dash line), first image P1(L)' and second image P2(L)' can be seen by the viewer such that they are separated from each other and a part of first image P1(L)' closer to second image P2(L)' is missed as shown in FIG. 19C.

This is caused because, when the gaze direction of the viewer is changed to diagonally front (dot-dot-dash line) as shown in FIG. 19A, the area on display screen 14a of display 14 visible to the viewer through first eyepiece 18 and second eyepiece 22 is changed. Therefore, such a phenomenon occurs where the viewer gazing forward can see first and second images P1(L)' and P2(L)' such that they are continuous, whereas the viewer gazing diagonally forward can see these images such that they are discontinuous.

As described above, considering that, when the gaze direction of the viewer varies, the area on display screen 14a of display 14 visible to the viewer through first eyepiece 18 and second eyepiece 22 is changed, first and second images P1(L) and P2(L) in the present exemplary embodiment include a common part (cross-hatched part) as shown in FIG. 20A. First image P1(L) has the common part on the side closer to second image P2(L), and second image P2(L) has the common part on the side closer to first image P1(L).

When gazing forward (solid line), the viewer can see first image P1(L) having the common part and second image P2(L) from which the common part is missed as being continuous as shown in FIG. 20B.

On the other hand, when gazing diagonally forward (dot-dot-dash line), the viewer can see first image P1(L) from which the common part is missed and second image P2(L) having the common part as being continuous as shown in FIG. 20C.

Therefore, because first image P1(L) and second image P2(L) have the common part (cross-hatched part), the viewer can see first image P1(L) and second image P2(L) as being continuous even if the gaze direction varies.

The description will be continued with reference back to FIG. 15. Image size correcting unit 56 in image processing unit 50 corrects first images P1(L) and P1(R) and second images P2(L) and P2(R) such that second images P2(L) and P2(R) become smaller than first images P1(L) and P1(R).

As shown in FIG. 1, in the optical system for the left eye, the distance between second display region 14c of display 14 and second eyepiece 22 is shorter than the distance between first display region 14b and first eyepiece 18. Therefore, if first image P1(L) displayed in first display region 14b and second image P2(L) displayed in second display region 14c have the same size, second image P2(L) is enlarged to be larger than first image P1(L) and projected onto the retina of eyeball e(L) of the viewer. Similarly, in the optical system for the right eye, second image P2(R) is enlarged to be larger than first image P1(R) and projected onto the retina of eyeball e(R) of the viewer.

Figure 21:
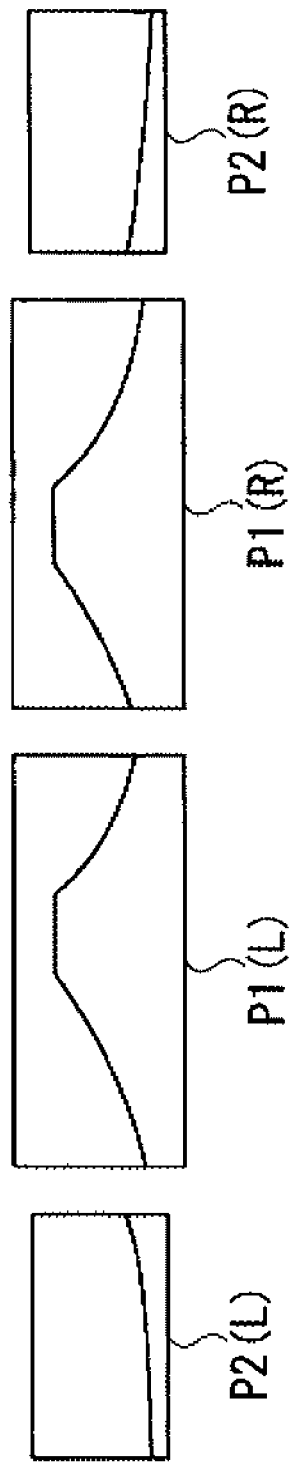
FIG. 21 is a view for describing correction of sizes of the first and second images.

In view of this, in order that the sizes of these images on the retinas of eyeballs e(L) and e(R) become the same, image size correcting unit 56 corrects the sizes of these images such that second images P2(L) and P2(R) are smaller than first images P1(L) and P1(R) as shown in FIG. 21. For example, image size correcting unit 56 reduces second images P2(L) and P2(R) or enlarges first images P1(L) and P1(R). The reduction scale factor or enlargement scale factor of the images is determined based on the optical characteristics of first eyepieces 18 and 20 and second eyepieces 22 and 24. Thus, the viewer can see second image P2(L), first image P1(L), first image P1(R), and second image P2(R) as being continuous without having a feeling of strangeness.

The description will be continued with reference back to FIG. 15. Distortion aberration correcting unit 58 and lateral chromatic aberration correcting unit 60 in image processing unit 50 correct first and second images P1(L), P1(R), P2(L), and P2(R) based on aberration characteristics of first eyepieces 18 and 20 and second eyepieces 22 and 24.

Aberration caused by lenses is roughly classified into distortion aberration that occurs even by monochromatic light and lateral chromatic aberration caused by a difference in wavelengths of light. Distortion aberration correcting unit 58 and lateral chromatic aberration correcting unit 60 correct first and second images P1(L), P1(R), P2(L), and P2(R) to cancel distortion aberration and lateral chromatic aberration caused by lenses. That is, they correct these images such that first and second images P1(L), P1(R), P2(L), and P2(R) almost equal to those obtained when an ideal lens causing no aberration is used are projected onto retinas of eyeballs e(L) and e(R) through first eyepieces 18 and 20 and second eyepieces 22 and 24.

For example, imagine that such distortion aberration occurs where, due to first eyepieces 18 and 20 and second eyepieces 22 and 24, rectangular first and second images P1(L), P1(R), P2(L), and P2(R) shown in FIG. 21 are distorted into a shape of a pincushion and projected onto the retinas of eyeballs e(L) and e(R).

Figure 22:
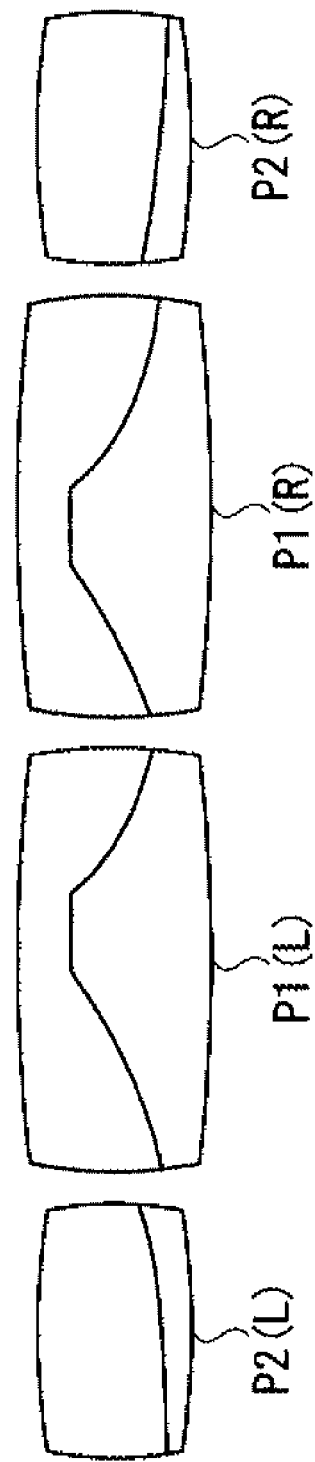
FIG. 22 is a view for describing one example of distortion aberration correction of the first and second images.

In such a case, distortion aberration correcting unit 58 corrects first and second images P1(L), P1(R), P2(L), and P2(R) into a shape of a barrel as shown in FIG. 22. Thus, first and second images having a shape of a barrel are distorted into a rectangular shape by first eyepieces 18 and 20 and second eyepieces 22 and 24 and projected onto the retinas of eyeballs e(L) and e(R). That is, the distortion aberration that distorts the images into a shape of a pincushion is canceled.

Lateral chromatic aberration correcting unit 60 corrects RGB values of respective pixels of first and second images P1(L), P1(R), P2(L), and P2(R) as lateral chromatic aberration correction. Specifically, lateral chromatic aberration correcting unit 60 performs lateral chromatic aberration correction for first and second images P1(L), P1(R), P2(L), and P2(R) such that RGB values of respective pixels of first and second images P1(L), P1(R), P2(L), and P2(R) after chromatic aberration occurs due to first eyepieces 18 and 20 and second eyepieces 22 and 24 are almost the same as RGB values of respective pixels of these images before the lateral chromatic aberration correction (for example, images just after being extracted by display image extracting unit 54). For example, in the lateral chromatic aberration correction, magnifications of red (R) and blue (B) are adjusted based on the magnification of green (G).

With distortion aberration correcting unit 58 and lateral chromatic aberration correcting unit 60, the viewer can see second image P2(L), first image P1(L), first image P1(R), and second image P2(R) as being continuous without having a feeling of strangeness.

Color tone adjusting unit 62 in image processing unit 50 adjusts the tones, for example, brightness or hue, of first and second images P1(L), P1(R), P2(L), and P2(R) based on viewing angle characteristics of displays 14 and 16.

In the present exemplary embodiment, displays 14 and 16 are composed of a liquid crystal display. First images P1(L) and P1(R) in first display regions 14b and 16b of displays 14 and 16 in FIG. 1 are seen by the viewer at a viewing angle of approximately 90 degrees, whereas second images P2(L) and P2(R) in second display regions 14c and 16c are seen at a viewing angle different from 90 degrees.

Thus, first images P1(L) and P1(R) and second images P2(L) and P2(R) are projected onto the retinas of eyeballs e(L) and e(R) with different tones, which may provide a feeling of strangeness to the viewer due to the difference in tone.

As a countermeasure, color tone adjusting unit 62 adjusts the tones of first and second images P1(L), P1(R), P2(L), and P2(R) such that these images are projected onto the retinas of eyeballs e(L) and e(R) of the viewer with substantially the same tone.

If an OLED display that provides the same tone despite the viewing angle is used for displays 14 and 16, color tone adjusting unit 62 may not be provided.

Further, in place of color tone adjusting unit 62, a film, coating layer, or filter that can adjust the tones of first and second images P1(L), P1(R), P2(L), and P2(R) may be provided to first eyepieces 18 and 20 and second eyepieces 22 and 24.

Display position adjusting unit 64 in image processing unit 50 adjusts the display positions of first and second images P1(L), P1(R), P2(L), and P2(R) in display screens 14a and 16a of displays 14 and 16. Specifically, display position adjusting unit 64 adjusts the display positions of these images such that the viewer can see these images as being continuous.

Output unit 66 in image processing unit 50 outputs first images P1(L) and P1(R) and second images P2(L) and P2(R) which have been corrected in size and aberration and adjusted in tones and display positions to displays 14 and 16, respectively.

Figure 23:
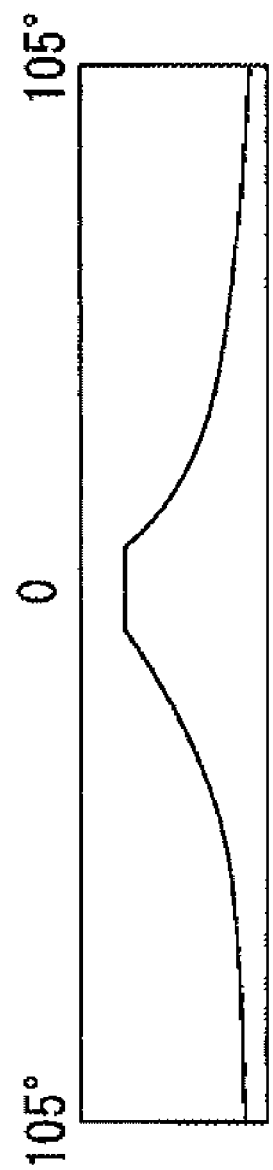
FIG. 23 is a view showing an image seen by the viewer.

According to the image processing by image processing unit 50 described above, the viewer can see second image P2(L), first image P1(L), first image P1(R), and second image P2(R) as being continuous, that is, as the image extending over the entire horizontal visual field as shown in FIG. 23, without having a feeling of strangeness.

Image processing unit 50 may be provided inside or outside main body 12 of display device 10. If image processing unit 50 is provided outside main body 12, display device 10 and image processing unit 50 are connected to each other by a wired or wireless communication path. If image processing unit 50 is provided outside, display device 10 is reduced in weight (as compared to a configuration where image processing unit 50 is provided inside), whereby usability of display device 10 can be improved.

According to the present exemplary embodiment as described above, a further sense of realism can be provided to the viewer by the head-mounted display device. That is, the present exemplary embodiment can provide a wide-field image to the viewer, as compared to a configuration where only one eyepiece is used.

The exemplary embodiment in the present disclosure is not limited to that described above.

In the exemplary embodiment described above, first eyepiece 18 has Fresnel lens portion 18d on a part of display-side lens surface 18a as shown in FIG. 8A. Second eyepiece 22 has the Fresnel lens portion on entire display-side lens surface 22a. Further, optical axis C1 of first eyepiece 18 and optical axis C2 of second eyepiece 22 intersect with each other at an angle of about 60 degrees as shown in FIG. 2. Moreover, optical axis C2 of second eyepiece 22 and second display region 14c are not perpendicular to each other as shown in FIG. 14. However, the exemplary embodiment of the present disclosure is not limited to these configurations.

For example, display-side lens surface 18a of first eyepiece 18 may entirely have the Fresnel lens portion or may entirely have the convex lens portion (without having the Fresnel lens portion). Further, second eyepiece 22 may have the Fresnel lens portion in only a part of display-side lens surface 22a, for example. Moreover, second display region 14c may be perpendicular to optical axis C2 of second eyepiece 22. In addition, optical axis C1 of first eyepiece 18 and optical axis C2 of second eyepiece 22 may intersect with each other at an angle other than 60 degrees. In this case, specific shapes and optical characteristics of first eyepiece 18 and second eyepiece 22 are different from those described above.

Figure 24:
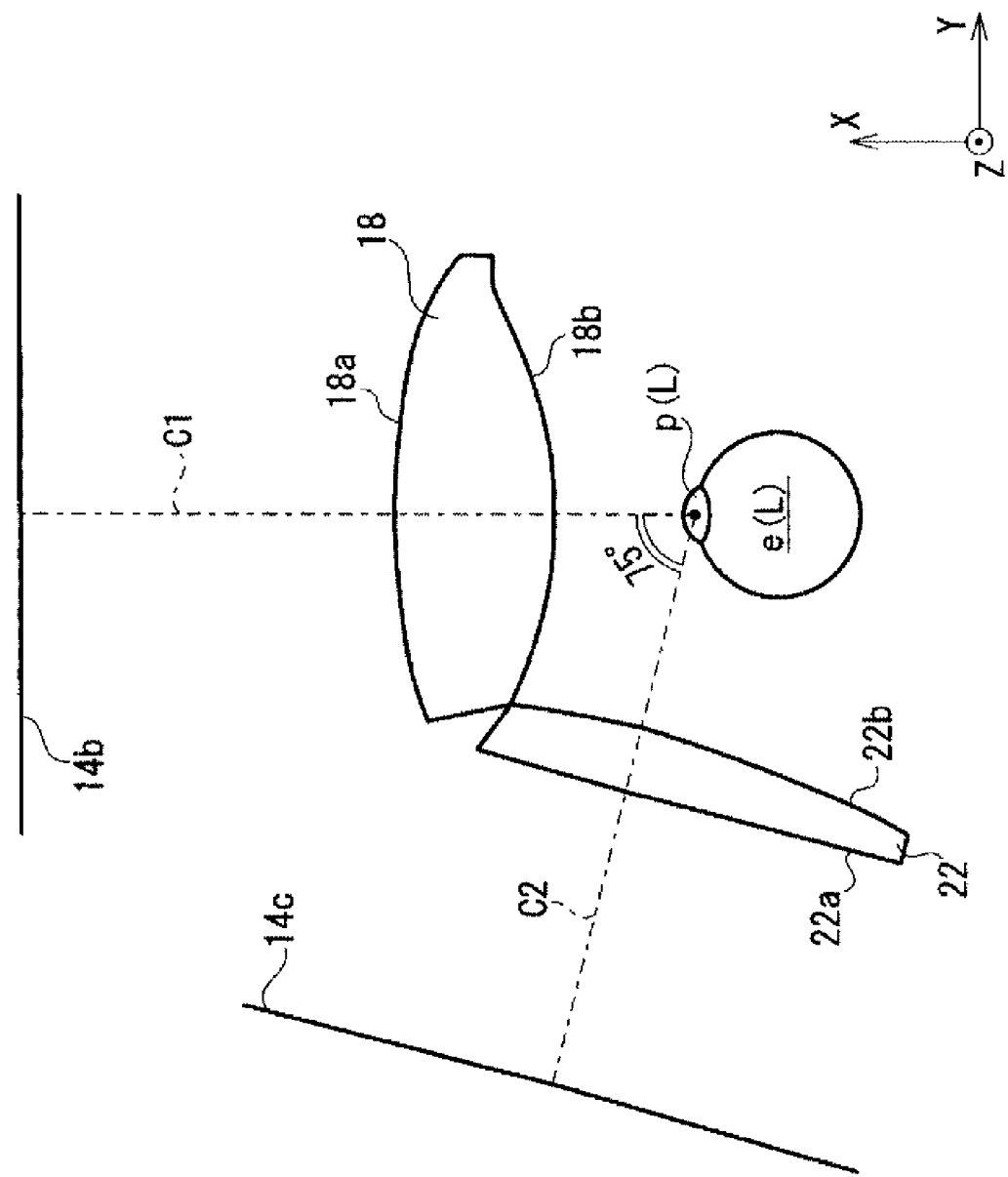
FIG. 24 is a view showing a first eyepiece and a second eyepiece according to one example.
Figure 25:
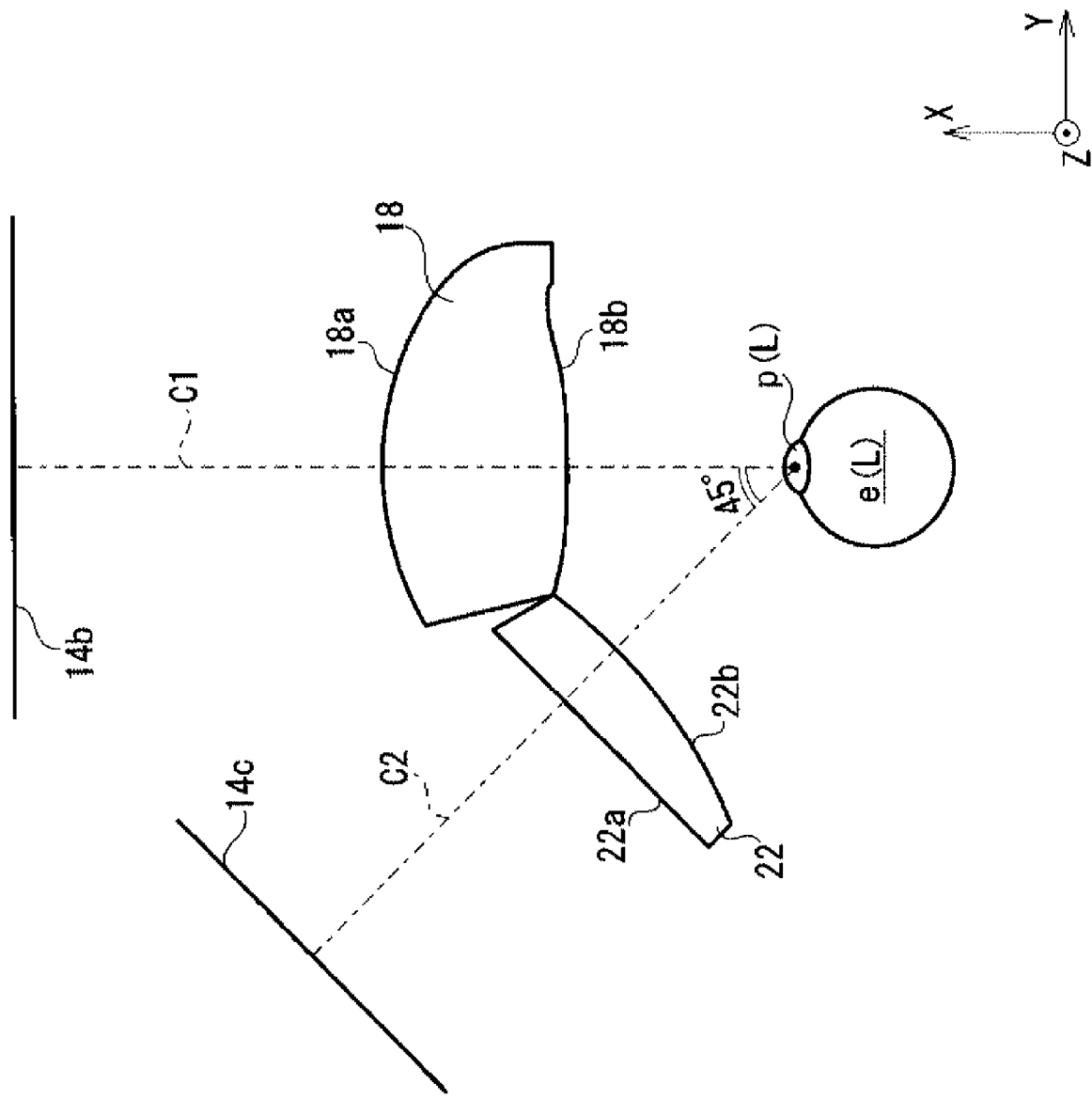
FIG. 25 is a view showing a first eyepiece and a second eyepiece according to another example.
Figure 26:
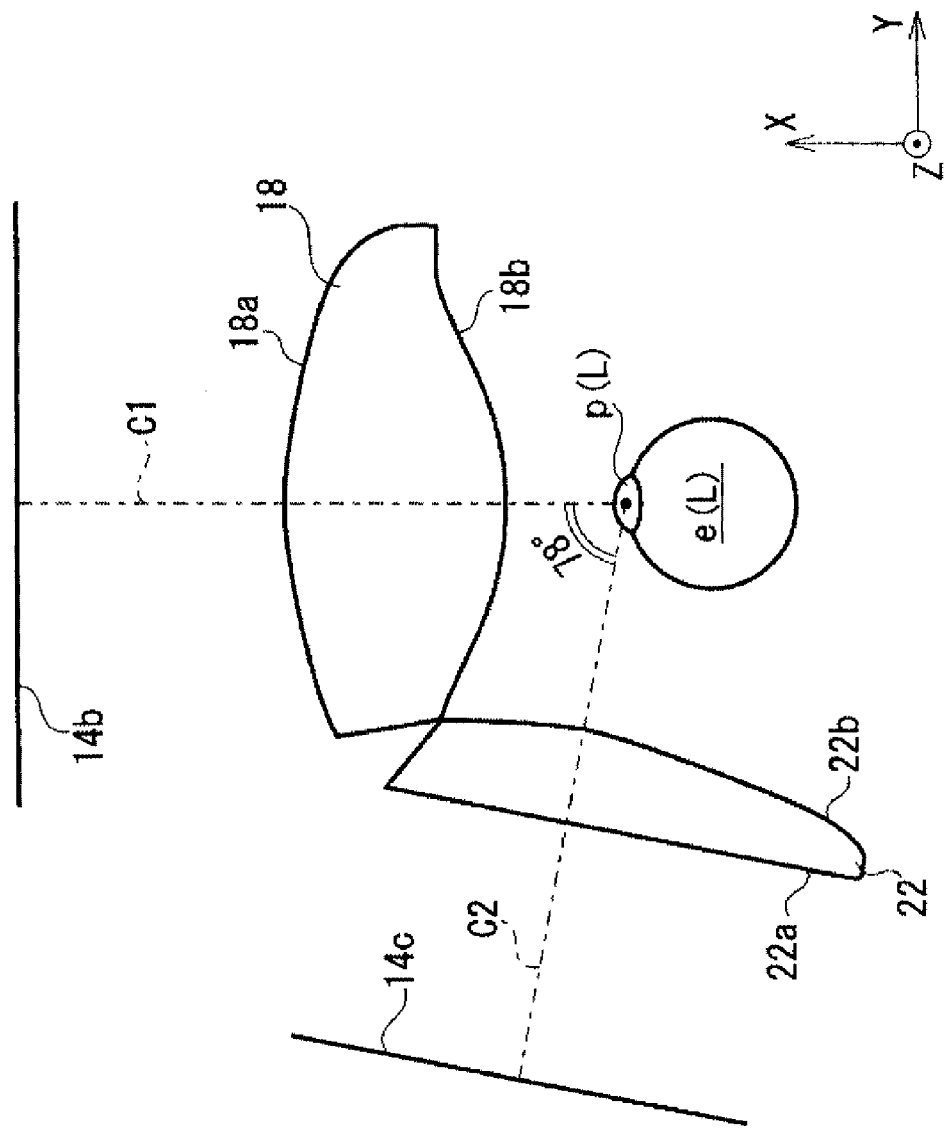
FIG. 26 is a view showing a first eyepiece and a second eyepiece according to still another example.

For example, FIGS. 24 to 26 respectively show first eyepiece 18 and second eyepiece 22 according to Examples 1 to 3.

Display-side lens surfaces 18a of first eyepieces 18 shown in FIGS. 24 to 26 are convex lens surfaces having different curvatures. The angle between optical axis C1 of first eyepiece 18 and optical axis C2 of second eyepiece 22 is 75 degrees in Example 1, 45 degrees in Example 2, and 78 degrees in Example 3.

In Examples 1 to 3 which are different from one another, optical characteristics and optical systems of first eyepieces 18 and second eyepieces 22 are different as shown in following Table 1.

TABLE 1

|  |  | Example 1 | Example 2 | Example 3 |
|---|---|---|---|---|
| Intersection angle of optical axis | | 75° | 45° | 78° |
| First eyepiece | Focal length (rear side) (mm) | 41.0 | 32.9 | 29.1 |
| | Half field angle (°) | 45.0 | 35.0 | 50.0 |
| | Inclination of cut surface with respect to optical axis (mm) | 9° | 13° | 9° |
| | Eye relief (mm) | 14.0 | 18.0 | 10.0 |
| | Distance between first eyepiece and display region on optical axis (mm) | 35.0 | 30.0 | 23.4 |
| | Thickness on optical axis (mm) | 15.0 | 15.0 | 19.0 |
| Second eyepiece | Focal length (rear side) (mm) | 31.5 | 34.6 | 28.7 |
| | Half field angle (°) | 42° | 30° | 42° |
| | Inclination of cut surface with respect to optical axis (mm) | 22° | 11° | 26° |
| | Eye relief (mm) | 21.7 | 30.0 | 20.0 |
| | Distance between second eyepiece and display region on optical axis (mm) | 28.0 | 31.4 | 23.0 |
| | Thickness on optical axis (mm) | 6.3 | 6.0 | 8.0 |

In Table 1, the "half field angle" is a half of the observation field angle, and "eye relief" is the distance from the viewer-side lens surface to the pupil of the viewer on the optical axis.

As described above, the exemplary embodiment of the present disclosure does not limit the optical characteristics and optical systems of the first eyepiece and second eyepiece. Specifically, in a broad sense, the head-mounted display according to the present disclosure is worn on the head of a viewer when used. The head-mounted display device includes a first display portion, a second display portion, a first eyepiece, and a second eyepiece. The first display portion is disposed in front of a pupil of the viewer gazing forward while facing the pupil of the viewer, and displays a first image. The second display portion is disposed on an ear side of the viewer and diagonally in front of the pupil of the viewer gazing forward, while facing the pupil of the viewer, and displays a second image. The first eyepiece is disposed between the pupil of the viewer and the first display portion and projects the first image onto the pupil of the viewer. The first eyepiece has a first display-portion-side lens surface and a first viewer-side lens surface. The second eyepiece is disposed between the pupil of the viewer and the second display portion and projects the second image onto the pupil of the viewer. The second eyepiece has a second display-portion-side lens surface and a second viewer-side lens surface. The second eyepiece is disposed adjacent to the first eyepiece at a position closer to the ear of the viewer than the first eyepiece is. An optical axis of the first eyepiece intersects with an optical axis of the second eyepiece at an angle ranging from 30 degrees to 80 degrees inclusive.

To give further details, when a wide-field image extending over the entire visual field of the viewer is to be presented to the viewer with the optical axis of the first eyepiece intersecting with the optical axis of the second eyepiece at an angle of less than 30 degrees, the second eyepiece may be increased in size, resulting in that the head-mounted display device may be increased in lateral size. Thus, it is not preferable.

In the exemplary embodiment described above, first eyepiece 18 and second eyepiece 22 are different members, and they are located adjacent to each other to construct lens array 26. Alternatively, the first eyepiece and the second eyepiece may be integrated as one unit (lens array).

Second Exemplary Embodiment

Figure 27:
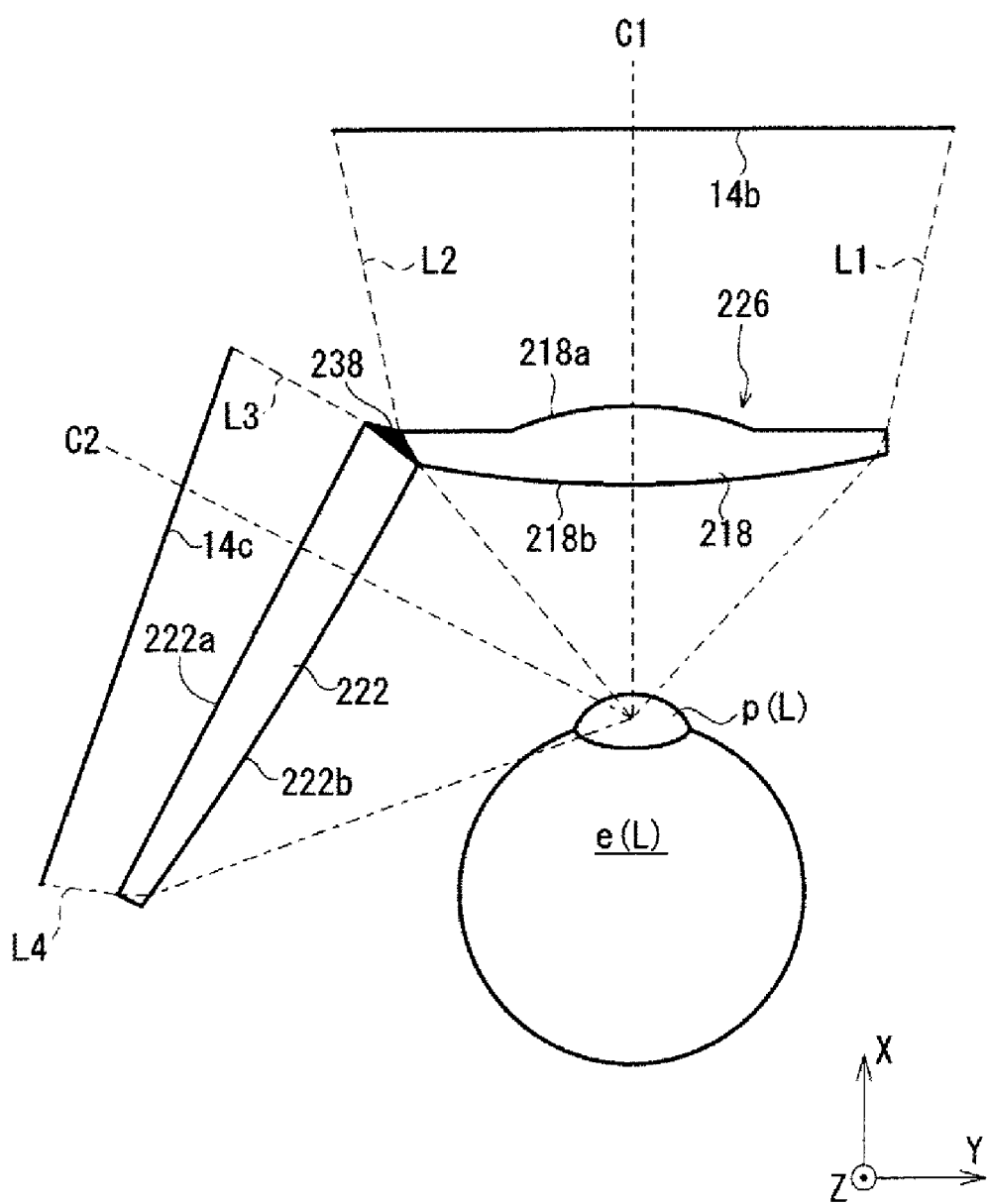
FIG. 27 is a schematic view of a lens array in a head-mounted display device according to a second exemplary embodiment.

FIG. 27 schematically shows a lens array in a head-mounted display device according to a second exemplary embodiment.

Lens array 226 includes first eyepiece unit 218 and second eyepiece unit 222. First eyepiece unit 218 and second eyepiece unit 222 have substantially the same optical characteristics of first eyepiece 18 and second eyepiece 22 described above in the first exemplary embodiment, respectively.

Lens array 226 is formed from a resin material by molding (using die), for example. Lens array 226 has light shielding member 238 that does not transmit light between first eyepiece unit 218 and second eyepiece unit 222. Specifically, light shielding member 238 is disposed between light ray L2 and light ray L3 in lens array 226. Light ray L2 is emitted from first display region 14b, enters first eyepiece unit 218 at an end of display-side lens surface 218a, the end being closer to second eyepiece unit 222, and is emitted toward pupil p(L) of the viewer from viewer-side lens surface 218b. Light ray L3 is emitted from second display region 14c, enters second eyepiece unit 222 at an end of display-side lens surface 222a, the end being closer to first eyepiece unit 218, and is emitted toward pupil p(L) of the viewer from viewer-side lens surface 222b.

In the above first exemplary embodiment, display 14 is a curved display. However, the exemplary embodiments of the present disclosure are not limited thereto.

Third Exemplary Embodiment

Figure 28:
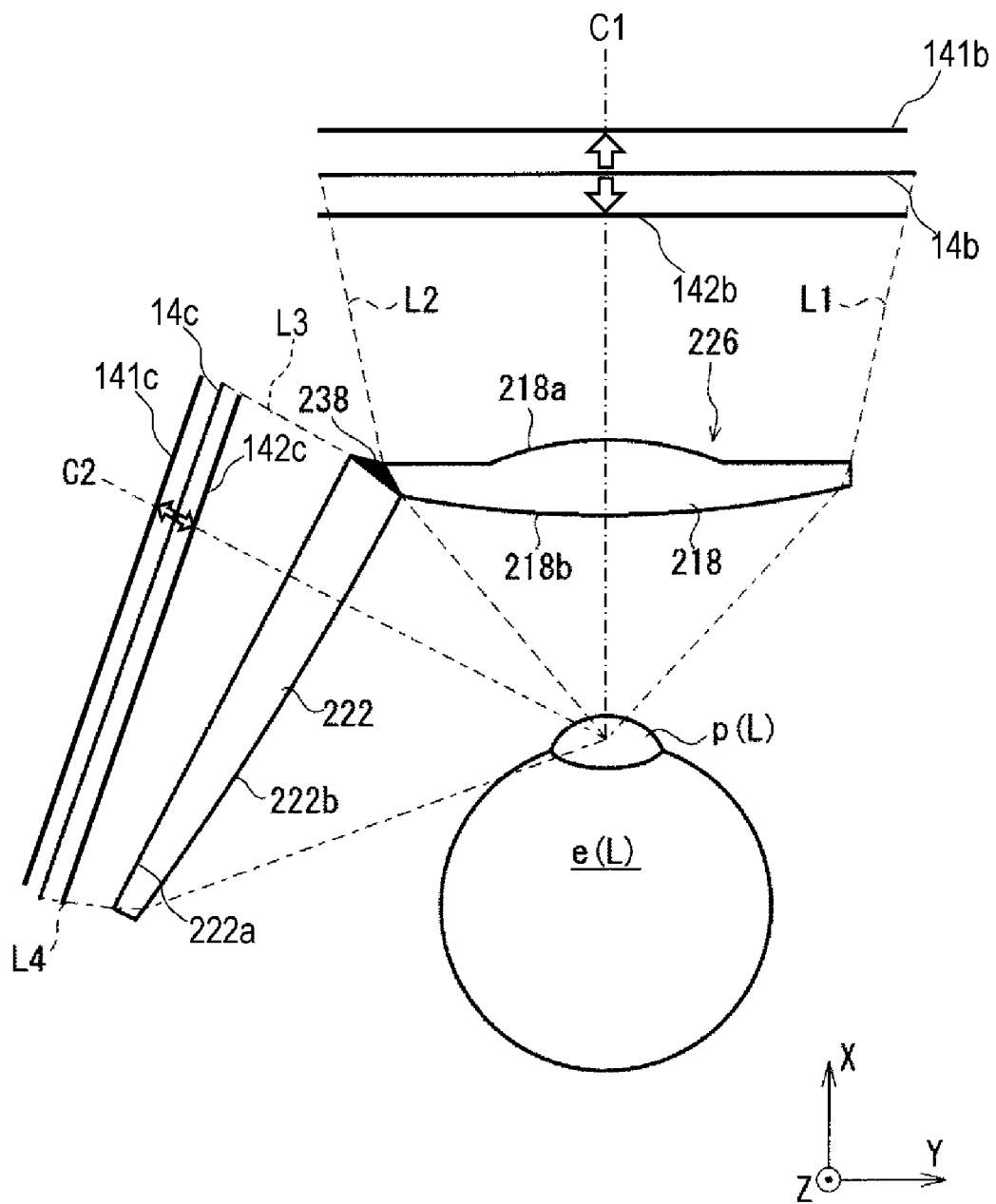
FIG. 28 is a schematic view showing a configuration of a head-mounted display device according to a third exemplary embodiment.
Figure 29:
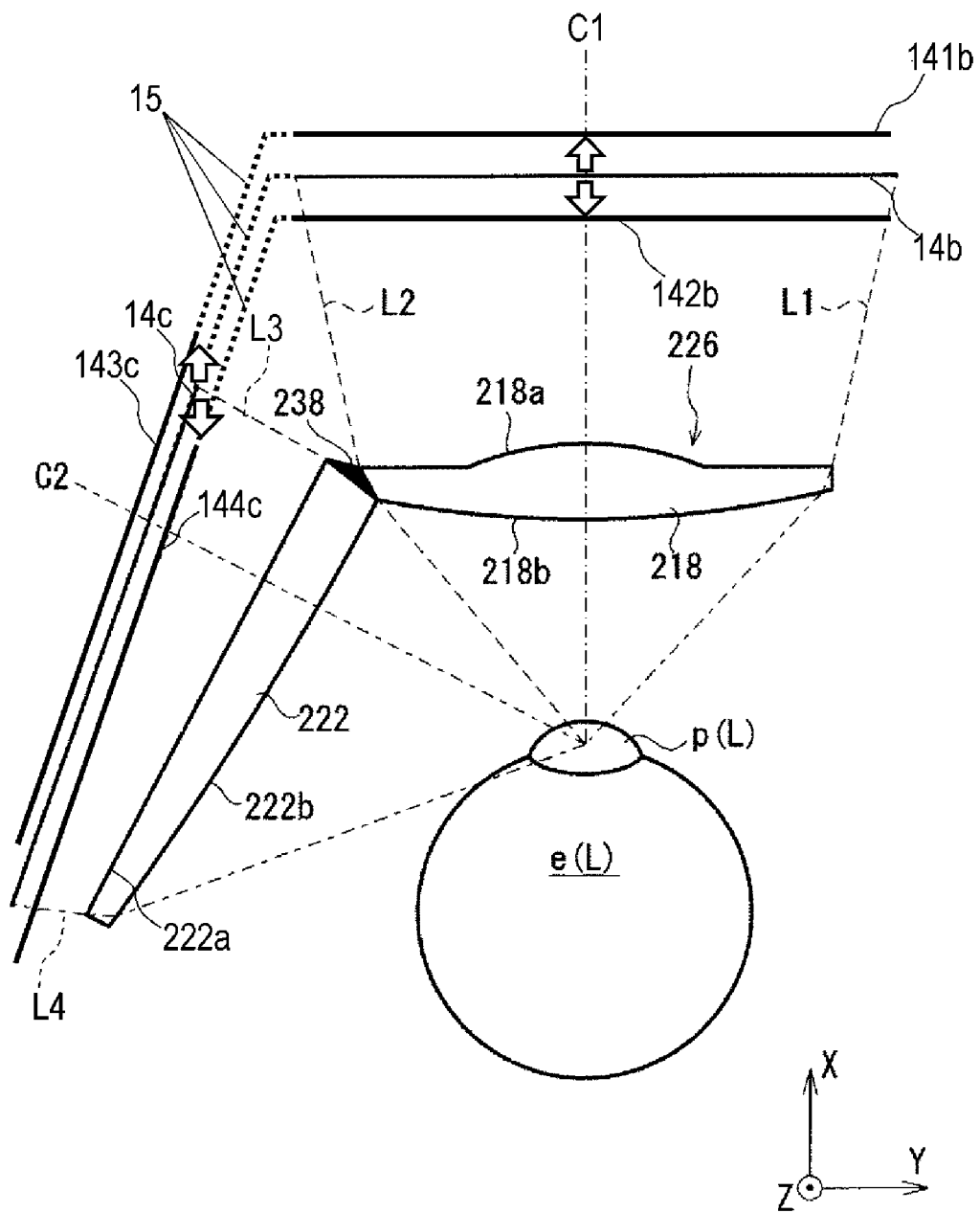
FIG. 29 is a schematic view showing a configuration of a head-mounted display device according to another mode of the third exemplary embodiment.
Figure 30:
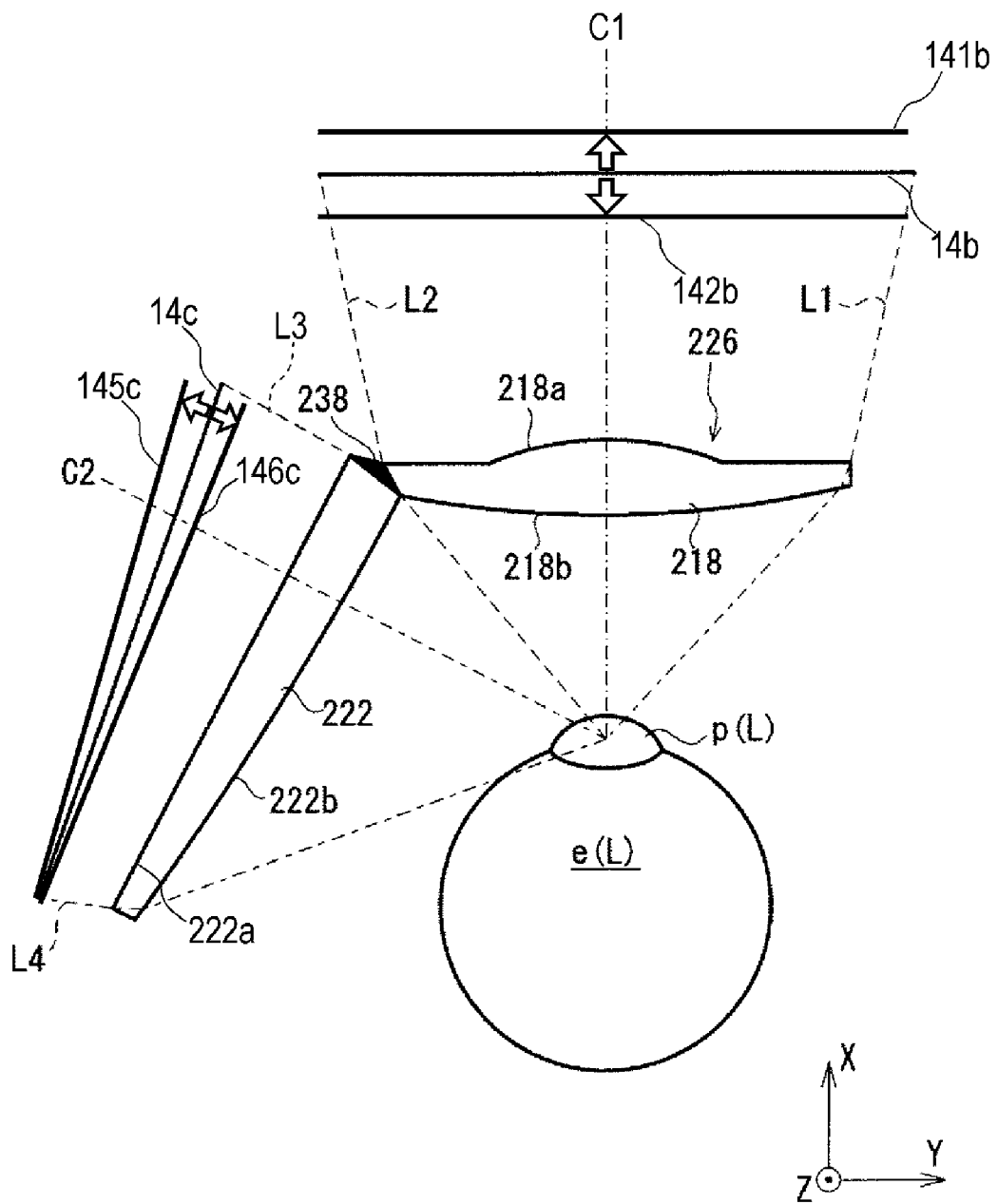
FIG. 30 is a schematic view showing a configuration of a head-mounted display device according to still another mode of the third exemplary embodiment.

FIG. 28 shows a head-mounted display device according to a third exemplary embodiment. In the first and second exemplary embodiments, second eyepiece unit 222 is disposed on the left eye side of the viewer. However, when a far-sighted or near-sighted viewer intends to wear regular glasses, second eyepiece unit 222 may interfere with the regular glasses. In view of this, in the third exemplary embodiment, a distance between display portion 14b and first eyepiece unit 218 and a distance between display portion 14c and second eyepiece unit 222 can be extended and reduced. Thus, even if the far-sighted or near-sighted viewer does not wear regular glasses, he/she can clearly see images displayed in display portions 14b and 14c. Note that FIGS. 29 and 30 show other modes of the third exemplary embodiment.

In FIG. 28, display portion 14b is movable in the direction of the optical axis of first eyepiece unit 218. Further, display portion 14c is movable in the direction of the optical axis of second eyepiece unit 222.

If the viewer is far-sighted, display portion 14b is moved toward position 141b and display portion 14c is moved toward position 141c.

On the contrary, if the viewer is near-sighted, display portion 14b is moved toward position 142b, and display portion 14c is moved toward position 142c.

In FIG. 28, display portions 14b and 14c are moved. However, eyepiece units 218 and 222 may be moved.

More strictly, when the distance between display portion 14b and first eyepiece unit 218 and the distance between display portion 14c and second eyepiece unit 222 are increased, the images which are displayed in display portions 14b and 14c and to be viewed by the viewer are distant and small, and therefore, it is preferable that the images displayed in display portions 14b and 14c are enlarged.

On the contrary, more strictly, when the distance between display portion 14b and first eyepiece unit 218 and the distance between display portion 14c and second eyepiece unit 222 are reduced, the images which are displayed in display portions 14b and 14c and to be viewed by the viewer are near and large, and therefore, it is preferable that the images displayed in display portions 14b and 14c are reduced.

FIG. 29 shows another mode of the third exemplary embodiment. In FIG. 28, display portion 14c is movable in the direction of the optical axis of second eyepiece unit 222. On the other hand, in FIG. 29, display portion 14c is movable in the direction of the optical axis of first eyepiece unit 218. With this configuration, when display portion 14b and display portion 14c are mechanically connected to each other by connecting portion 15, the distance between display portion 14b and first eyepiece unit 218 and the distance between display portion 14c and second eyepiece unit 222 can be easily changed in conjunction with each other. Further, display portion 14c does not move laterally as in FIG. 28, whereby the width of a housing can be reduced.

If the viewer is far-sighted, display portion 14b is moved toward position 141b, and display portion 14c is moved toward position 143c.

On the contrary, if the viewer is near-sighted, display portion 14b is moved toward position 142b, and display portion 14c is moved toward position 144c.

In FIG. 29, display portions 14b and 14c are moved. However, eyepiece units 218 and 222 may be moved.

In FIG. 29, in response to a far-sighted or near-sighted viewer, display portion 14c is moved in the horizontal direction from the optical axis of second eyepiece unit 222. In view of this, a sensor for detecting an amount of movement of display portion 14c is provided, and even when display portion 14c is moved, the movement of display portion 14c is canceled such that the position of the image displayed in display portion 14c is unchanged.

More strictly, when the distance between display portion 14b and first eyepiece unit 218 and the distance between display portion 14c and second eyepiece unit 222 are increased, the images which are displayed in display portions 14b and 14c and to be viewed by the viewer are distant and small, and therefore, it is preferable that the images displayed in display portions 14b and 14c are enlarged.

On the contrary, more strictly, when the distance between display portion 14b and first eyepiece unit 218 and the distance between display portion 14c and second eyepiece unit 222 are reduced, the images which are displayed in display portions 14b and 14c and to be viewed by the viewer are near and large, and therefore, it is preferable that the images displayed in display portions 14b and 14c are reduced.

FIG. 30 shows another mode of the third exemplary embodiment, wherein an installation angle of display portion 14c can be changed. In a human visual field, resolution becomes low at an outside observation field angle, and an image to be viewed is not required to be clear. Therefore, at the observation field angle at an outer side of the human visual field, the amount of movement of display portion 14c is reduced to prevent an increase in the width of the housing.

If the viewer is far-sighted, display portion 14b is moved toward position 141b, and display portion 14c is moved toward position 145c.

On the contrary, if the viewer is near-sighted, display portion 14b is moved toward position 142b, and display portion 14c is moved toward position 146c.

In FIG. 30, display portions 14b and 14c are moved. However, eyepiece units 218 and 222 may be moved.

In FIG. 30, in response to a far-sighted or near-sighted viewer, display portion 14c is moved in the horizontal direction from the optical axis of second eyepiece unit 222. In view of this, a sensor for detecting an amount of movement of display portion 14c is provided, and even when display portion 14c is moved, the movement of display portion 14c is canceled such that the position of the image displayed in display portion 14c is unchanged.

More strictly, when the distance between display portion 14b and first eyepiece unit 218 and the distance between display portion 14c and second eyepiece unit 222 are increased, the images which are displayed in display portions 14b and 14c and to be viewed by the viewer are distant and small, and therefore, it is preferable that the images displayed in display portions 14b and 14c are enlarged.

On the contrary, more strictly, when the distance between display portion 14b and first eyepiece unit 218 and the distance between display portion 14c and second eyepiece unit 222 are reduced, the images which are displayed in display portions 14b and 14c and to be viewed by the viewer are near and large, and therefore, it is preferable that the images displayed in display portions 14b and 14c are reduced.

Fourth Exemplary Embodiment

Figure 31:
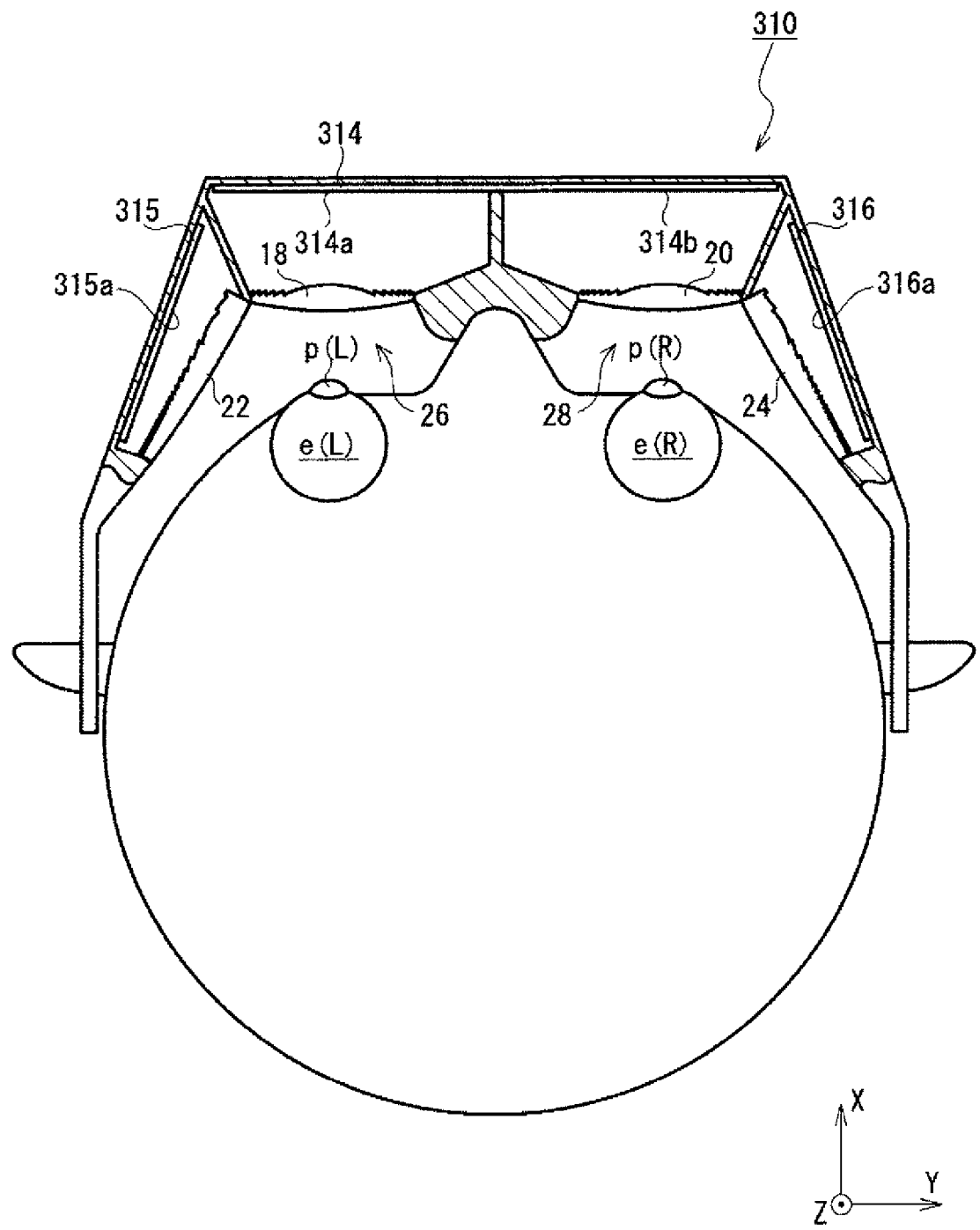
FIG. 31 is a schematic view showing a configuration of a head-mounted display device according to a fourth exemplary embodiment.

FIG. 31 shows a head-mounted display device according to a fourth exemplary embodiment. The components except for the displays are substantially the same as the components of the exemplary embodiment shown in FIG. 1, and thus, are identified by the same reference signs.

Head-mounted display device 310 according to the present exemplary embodiment includes three flat plate displays 314, 315, and 316.

Display 314 is disposed in front of pupils p(L) and p(R) of eyeballs e(L) and e(R) gazing forward while facing pupils p(L) and p(R). Display 314 has, in its display screen, display region 314a for the left eye for displaying a first image for the left eye, which is to be projected onto first eyepiece 18 for the left eye, and display region 314b for the right eye for displaying the first image for the right eye, which is to be projected onto first eyepiece 20 for the right eye.

Display 315 is disposed outwardly and diagonally in front of pupil p(L) of eyeball e(L) of the left eye gazing forward while facing pupil p(L). Display 315 has, in its display screen, display region 315a for displaying a second image for the left eye projected onto second eyepiece 22 for the left eye.

Display 316 is disposed outwardly and diagonally in front of pupil p(R) of eyeball e(R) of the right eye gazing forward while facing pupil p(R). Display 316 has, in its display screen, display region 316a for displaying a second image for the right eye projected onto second eyepiece 24 for the right eye.

Respective displays 314, 315, and 316 have a flat plate shape, and therefore, are easy to be manufactured. Thus, they can be manufactured at low cost.

As described above, the head-mounted display device according to one aspect of the present disclosure is worn on a head of a viewer when used. The head-mounted display device includes a first display portion, a second display portion, a first eyepiece, and a second eyepiece. The first display portion is disposed in front of a pupil of the viewer gazing forward while facing the pupil of the viewer, and displays a first image. The second display portion is disposed on an ear side of the viewer and diagonally in front of the pupil of the viewer gazing forward, while facing the pupil of the viewer, and displays a second image. The first eyepiece is disposed between the pupil of the viewer and the first display portion and projects the first image onto the pupil of the viewer. The first eyepiece has a first display-portion-side lens surface and a first viewer-side lens surface. The second eyepiece is disposed between the pupil of the viewer and the second display portion and projects the second image onto the pupil of the viewer. The second eyepiece has a second display-portion-side lens surface and a second viewer-side lens surface. The second eyepiece is disposed adjacent to the first eyepiece at a position closer to the ear of the viewer than the first eyepiece is. An optical axis of the first eyepiece intersects with an optical axis of the second eyepiece at an angle ranging from 30 degrees to 80 degrees inclusive.

With this configuration, a further sense of realism can be provided to the viewer by the head-mounted display device. Specifically, the head-mounted display device can provide a wide-field image to the viewer, as compared to a configuration using only one eyepiece.

For example, the optical axis of the first eyepiece and the optical axis of the second eyepiece may intersect with each other at the pupil of the viewer.

For example, the first eyepiece may be disposed such that the optical axis thereof is parallel to a straight line extending in a gaze direction of the pupil of the viewer gazing forward.

For example, the optical axis of the second eyepiece may be offset from a center of a contour shape of the second eyepiece. With this configuration, a part, which has less aberration and is near the optical axis and through which the viewer can see the second image without a feeling of strangeness, in the second eyepiece can be located closer to the center of the visual field of the viewer.

For example, a ratio of an observation field angle of the second eyepiece to an observation field angle of the first eyepiece may be less than 0.95. This can prevent a boundary between the first image and the second image from being present in the center of the visual field of the viewer where a capability of identifying information is high.

For example, paraxial radius of curvature R of the first viewer-side lens surface and rear-side focal length f may satisfy an inequality of $0<R/f<3.0$. Accordingly, the observation field angle of the first eyepiece can be increased without increasing the radial size of the first eyepiece.

For example, the observation field angle of the first eyepiece may be from 60 degrees to 120 degrees inclusive. Accordingly, only the first eyepiece is disposed in the central area of the visual field where a high capability of identifying information is exhibited. Thus, the viewer can clearly see the image through only the first eyepiece.

For example, a distance between the first viewer-side lens surface and the pupil of the viewer may be shorter than a distance between the second viewer-side lens surface and the pupil of the viewer. Accordingly, the observation field angle of the first eyepiece can be increased with respect to the observation field angle of the second eyepiece without increasing the radial size of the first eyepiece.

For example, a contour shape of the first viewer-side lens surface and a contour shape of the second viewer-side lens surface may have joint shape parts which are in contact with each other such that the first viewer-side lens surface and the second viewer-side lens surface are horizontally continuous in an entire visual field of the viewer in the vertical direction or in a central part of the visual field. With this configuration, even if moving the gaze in the vertical direction, the viewer can see the first image transmitted through the first eyepiece and the second image transmitted through the second eyepiece as being horizontally continuous.

For example, the head-mounted display device may have a lens array constructed by integrating the first eyepiece and the second eyepiece. In this configuration, the first display portion emits a first light ray that enters an end of the display-portion-side lens surface of the first eyepiece, the end being adjacent to the second eyepiece, and that is emitted from the viewer-side lens surface of the first eyepiece toward the pupil of the viewer. On the other hand, the second display portion emits a second light ray that enters an end of the display-portion-side lens surface of the second eyepiece, the end being adjacent to the first eyepiece, and that is emitted from the viewer-side lens surface of the second eyepiece toward the pupil of the viewer. A light shielding member may be disposed between the first light ray and the second light ray in the lens array.

For example, the display-portion-side lens surface of the first eyepiece may have, at least partly, a Fresnel lens portion. With this configuration, the first eyepiece can be thinned, in other words, can be reduced in size and weight. Consequently, a size reduction and weight reduction of the head-mounted display device can be achieved.

For example, the display-portion-side lens surface of the second eyepiece may have, at least partly, a Fresnel lens portion. With this configuration, the second eyepiece can be thinned, in other words, can be reduced in size and weight. Consequently, a size reduction and weight reduction of the head-mounted display device can be achieved.

The exemplary embodiments have been described herein as an illustrative example of the technique in the present disclosure. The accompanying drawings and the detailed description have been provided for this purpose. Accordingly, components appearing in the accompanying drawings and the detailed description include not only the components essential for solving the technical problems set forth herein, but also the components that are not essential for solving the technical problems but are merely used to illustrate the technique described herein. It should not be therefore determined that the unessential components in the accompanying drawings and the detailed description are essential only based on the fact that these components are included in the drawings and the description.

The above exemplary embodiments have been provided to exemplify the technique according to the present disclosure, and various changes, replacements, additions, omissions, and the like can be made within the scope of the claims and equivalents thereof.

INDUSTRIAL APPLICABILITY

The present disclosure is applicable to head-mounted display devices worn on the head when used.

REFERENCE MARKS IN THE DRAWINGS 10, 310: head-mounted display device (display device)
12: main body
14, 16, 314, 315, 316: display
14a, 16a: display screen
14b, 16b: first display portion (first display region)
14c, 16c: second display portion (second display region)
14ca: part
15: connecting portion
18, 20: first eyepiece
18a, 20a, 22a, 24a, 218a, 222a: display-side lens surface
18b, 20b, 22b, 24b, 218b, 222b: viewer-side lens surface
18c: convex lens portion
18d, 22g: Fresnel lens portion
18e, 22d: upper cut surface
18f, 22e: lower cut surface
18g: left cut surface
18h, 22f: right cut surface
22, 24: second eyepiece
22c: rising surface
26, 28, 226: lens array
30: nose pad
32, 34: ear pad
36: light shielding plate
50: image processing unit
52: original image acquiring unit
54: display image extracting unit
56: image size correcting unit
58: distortion aberration correcting unit
60: lateral chromatic aberration correcting unit
62: color tone adjusting unit
64: display position adjusting unit
66: output unit
141b, 142b, 141c, 142c, 143c, 144c, 145c, 146c: position
218: first eyepiece unit
222: second eyepiece unit
238: light shielding member
314a, 314b, 315a, 316a: display region
C1: optical axis
C2: optical axis
p(L): pupil

The invention claimed is:
1. A head-mounted display device that is worn on a head of a viewer when used, the head-mounted display device comprising:
   a first display portion that is disposed in front of a pupil of the viewer gazing forward, while facing the pupil, the first display portion displaying a first image;
   a second display portion that is disposed close to an ear of the viewer and diagonally in front of the pupil, while facing the pupil, the second display portion displaying a second image;
   a first eyepiece having a first display-portion-side lens surface and a first viewer-side lens surface, disposed between the pupil and the first display portion, and projecting the first image onto the pupil, the first display-portion-side lens surface being a surface closer to the first display portion than the viewer, the first viewer-side lens surface being a surface closer to the viewer than the first display portion; and
   a second eyepiece having a second display-portion-side lens surface and a second viewer-side lens surface, disposed between the pupil and the second display portion, and projecting the second image onto the pupil, the second display-portion-side lens surface being a surface closer to the second display portion than the viewer, the second viewer-side lens surface being a surface closer to the viewer than the second display portion,
   wherein the second eyepiece is disposed adjacent to the first eyepiece at a position closer to an ear of the viewer than the first eyepiece is, an optical axis of the first eyepiece and an optical axis of the second eyepiece intersect with each other at an angle ranging from 30 degrees to 80 degrees inclusive, the first display portion and the second display portion are separate and move separately, a distance between the first display portion and the first eyepiece in a direction parallel to the optical axis of the first eyepiece is changeable, a distance between the second display portion and the second eyepiece in a direction parallel to the optical axis of the second eyepiece is changeable, and the distance between the second display portion and the second eyepiece is increased with an increase in the distance between the first display portion and the first eyepiece.

2. The head-mounted display device according to claim 1, wherein a display position of the second image displayed in the second display portion horizontally moves toward an ear of the viewer with respect to the first display portion with an increase in the distance between the first display portion and the first eyepiece.

3. The head-mounted display device according to claim 1, wherein a display position of the second image displayed in the second display portion horizontally moves toward the first display portion with an increase in the distance between the first display portion and the first eyepiece.

4. The head-mounted display device according to claim 1, wherein a distance between the second display portion and the second eyepiece is shorter than a distance between the first display portion and the first eyepiece.

5. The head-mounted display device according to claim 4, wherein the optical axis of the first eyepiece is parallel to a straight line extending in a gaze direction of the pupil of the viewer gazing forward.

6. The head-mounted display device according to claim 1, wherein a distance between the second display portion and the second eyepiece becomes shorter with an increase in a distance from the first display portion.

7. The head-mounted display device according to claim 6, wherein the optical axis of the first eyepiece is parallel to a straight line extending in a gaze direction of the pupil of the viewer gazing forward.

8. The head-mounted display device according to claim 1, wherein the optical axis of the second eyepiece is offset from a center of a contour shape of the second eyepiece.

9. The head-mounted display device according to claim 8, wherein the optical axis of the first eyepiece is parallel to a straight line extending in a gaze direction of the pupil of the viewer gazing forward.

10. The head-mounted display device according to claim 1, wherein a contour shape of the first viewer-side lens surface and a contour shape of the second viewer-side lens surface respectively have joint shape parts that are in contact with each other, and the first viewer-side lens surface and the second viewer-side lens surface are horizontally continuous through the joint shape parts in an entire visual field of the viewer in a vertical direction or in a central part of a visual field of the viewer.

11. The head-mounted display device according to claim 10, wherein the first display portion emits a first light ray that enters an end of the first display-portion-side lens surface and is emitted from the first viewer-side lens surface toward the pupil of the viewer, the end being adjacent to the second eyepiece, the second display portion emits a second light ray that enters an end of the second display-portion-side lens surface and is emitted from the second viewer-side lens surface toward the pupil of the viewer, the end being adjacent to the first eyepiece, the first eyepiece has a radial end surface inclined with respect to the optical axis of the first eyepiece to extend along the first light ray emitted toward the pupil of the viewer, and the second eyepiece has a radial end surface inclined with respect to the optical axis of the second eyepiece to extend along the second light ray emitted toward the pupil of the viewer.

12. The head-mounted display device according to claim 1, wherein a ratio of an observation field angle of the second eyepiece to an observation field angle of the first eyepiece is less than 0.95.

13. The head-mounted display device according to claim 12, wherein the optical axis of the first eyepiece is parallel to a straight line extending in a gaze direction of the pupil of the viewer gazing forward.

14. The head-mounted display device according to claim 12, wherein a ratio R/f of a paraxial radius of curvature R of the first viewer-side lens surface to a rear-side focal length f of the first eyepiece is larger than 0 and smaller than 3.0.

15. The head-mounted display device according to claim 14, wherein the optical axis of the first eyepiece is parallel to a straight line extending in a gaze direction of the pupil of the viewer gazing forward.

16. The head-mounted display device according to claim 14, wherein the observation field angle of the first eyepiece is from 60 degrees to 120 degrees inclusive.

17. The head-mounted display device according to claim 16, wherein the optical axis of the first eyepiece is parallel to a straight line extending in a gaze direction of the pupil of the viewer gazing forward.

18. A head-mounted display device that is worn on a head of a viewer when used, the head-mounted display device comprising:

a first display portion that is disposed in front of a pupil of the viewer gazing forward, while facing the pupil, the first display portion displaying a first image;

a second display portion that is disposed close to an ear of the viewer and diagonally in front of the pupil, while facing the pupil, the second display portion displaying a second image;

a first eyepiece having a first display-portion-side lens surface and a first viewer-side lens surface, disposed between the pupil and the first display portion, and projecting the first image onto the pupil, the first display-portion-side lens surface being a surface closer to the first display portion than the viewer, the first viewer-side lens surface being a surface closer to the viewer than the first display portion; and a second eyepiece having a second display-portion-side lens surface and a second viewer-side lens surface, disposed between the pupil and the second display portion, and projecting the second image onto the pupil, the second display-portion-side lens surface being a surface closer to the second display portion than the viewer, the second viewer-side lens surface being a surface closer to the viewer than the second display portion, wherein the second eyepiece is disposed adjacent to the first eyepiece at a position closer to an ear of the viewer than the first eyepiece is, an optical axis of the first eyepiece and an optical axis of the second eyepiece intersect with each other at an angle ranging from 30 degrees to 80 degrees inclusive, the first display portion and the second display portion are separate and move separately, a distance between the first display portion and the first eyepiece in a direction parallel to the optical axis of the first eyepiece is changeable, a distance between the second display portion and the second eyepiece is changeable such that the change is greater at a position closer to the first eyepiece, and with an increase in the distance between the first display portion and the first eyepiece, the distance between the second display portion and the second eyepiece is increased.

19. A head-mounted display device that is worn on a head of a viewer when used, the head-mounted display device comprising:

a first display portion that is disposed in front of a pupil of the viewer gazing forward, while facing the pupil, the first display portion displaying a first image;

a second display portion that is disposed close to an ear of the viewer and diagonally in front of the pupil, while facing the pupil, the second display portion displaying a second image;

a first eyepiece having a first display-portion-side lens surface and a first viewer-side lens surface, disposed between the pupil and the first display portion, and projecting the first image onto the pupil, the first display-portion-side lens surface being a surface closer to the first display portion than the viewer, the first viewer-side lens surface being a surface closer to the viewer than the first display portion; and a second eyepiece having a second display-portion-side lens surface and a second viewer-side lens surface, disposed between the pupil and the second display portion, and projecting the second image onto the pupil, the second display-portion-side lens surface being a surface closer to the second display portion than the viewer, the second viewer-side lens surface being a surface closer to the viewer than the second display portion, wherein the second eyepiece is disposed adjacent to the first eyepiece at a position closer to an ear of the viewer than the first eyepiece is, an optical axis of the first eyepiece and an optical axis of the second eyepiece intersect with each other at an angle ranging from 30 degrees to 80 degrees inclusive, a distance between the second display portion and the second eyepiece is shorter than a distance between the first display portion and the first eyepiece, the distance between a flat surface of the second display portion and the second eyepiece becomes shorter with an increase in a distance from the first display portion, a distance between the first display portion and the first eyepiece in a direction parallel to the optical axis of the first eyepiece is changeable, the distance between the second display portion and the second eyepiece in a direction parallel to the optical axis of the first eyepiece is changeable, and the distance between the second display portion and the second eyepiece is increased with an increase in the distance between the first display portion and the first eyepiece.

\* \* \* \* \*